(12) United States Patent  
McGiffin et al.

(10) Patent No.: US 8,271,305 B2  
(45) Date of Patent: *Sep. 18, 2012

(54) ACCOUNT LEVEL PARTICIPATION FOR UNDERWRITING COMPONENTS

(75) Inventors: Gail E. McGiffin, Summit, NJ (US); Jason A. Birdsell, Wayne, PA (US); Jeffrey R. Rauch, Broomall, PA (US); Devdas Nandan, Plainsboro, NJ (US); Patrick J. Corless, Mahwah, NJ (US)

(73) Assignee: Accenture Global Services Limited, Dublin (IE)

( * ) Notice: Subject to any disclaimer, the term of this patent is extended or adjusted under 35 U.S.C. 154(b) by 153 days.

This patent is subject to a terminal disclaimer.

(21) Appl. No.: 12/728,859

(22) Filed: Mar. 22, 2010

(65) Prior Publication Data

US 2010/0205015 A1 Aug. 12, 2010

Related U.S. Application Data

(63) Continuation of application No. 10/783,841, filed on Feb. 20, 2004, now Pat. No. 7,685,008.

(51) Int. Cl.  
*G06Q 40/00* (2012.01)

(52) U.S. Cl. .............................. 705/4; 705/35

(58) Field of Classification Search .................. 705/4, 35  
See application file for complete search history.

(56) References Cited

U.S. PATENT DOCUMENTS

| | | | | |
|---|---|---|---|---|
| 4,975,840 A * | 12/1990 | DeTore et al. | ..................... | 705/4 |
| 5,191,522 A * | 3/1993 | Bosco et al. | ...................... | 705/4 |
| 5,446,885 A * | 8/1995 | Moore et al. | .......................... | 1/1 |
| 5,659,723 A * | 8/1997 | Dimitrios et al. | ..................... | 1/1 |
| 5,664,177 A * | 9/1997 | Lowry | .................................. | 1/1 |
| 5,855,005 A * | 12/1998 | Schuler et al. | ..................... | 705/4 |
| 6,023,508 A * | 2/2000 | Bombard et al. | ................ | 705/69 |
| 6,151,601 A * | 11/2000 | Papierniak et al. | ..................... | 1/1 |
| 6,240,422 B1 * | 5/2001 | Atkins et al. | .................. | 719/315 |
| 6,317,722 B1 * | 11/2001 | Jacobi et al. | ............... | 705/14.51 |
| 6,381,576 B1 * | 4/2002 | Gilbert | .............................. | 705/2 |
| 6,460,028 B1 * | 10/2002 | Penoyer | ................................. | 1/1 |
| 6,470,343 B1 * | 10/2002 | O'Brien et al. | ....................... | 1/1 |
| 6,477,660 B1 * | 11/2002 | Sohner | .............................. | 714/1 |
| 6,578,766 B1 * | 6/2003 | Parker et al. | ............. | 235/462.01 |
| 6,609,132 B1 * | 8/2003 | White et al. | .......................... | 1/1 |
| 6,611,832 B1 * | 8/2003 | van Lunteren | ......................... | 1/1 |
| 7,409,355 B1 * | 8/2008 | Guyan et al. | ...................... | 705/4 |

(Continued)

OTHER PUBLICATIONS

Perusse, Bernard. Change Insurance Company is quick fix. The Gazette. Apr. 30, 1998. p. 1-4.*

(Continued)

*Primary Examiner* — Susanna M Meinecke Diaz  
*Assistant Examiner* — Jamie Swartz  
(74) *Attorney, Agent, or Firm* — Brinks Hofer Gilson & Lione

(57) ABSTRACT

An account management system has been developed that enables customer or client-related information to be stored, viewed and manipulated in a manner that reflects the relationship among different customers. The account management system includes an account data structure that defines accounts and relates customers to accounts so that the accounts include a group of related customers. In addition, a method of managing an underwriting account for an insurance policy has been developed. In particular, a method comprises the steps of establishing a plurality of participants; assigning each participant of the plurality of participants to an account; establishing business rules at an account level; and providing an underwriting decision for an account based upon the business rules.

21 Claims, 24 Drawing Sheets

U.S. PATENT DOCUMENTS

| | | | |
|---|---|---|---|
| 2001/0010048 A1* | 7/2001 | Kobayashi | 707/2 |
| 2002/0002475 A1* | 1/2002 | Freedman et al. | 705/4 |
| 2002/0004686 A1* | 1/2002 | Chiba | 700/97 |
| 2002/0111835 A1* | 8/2002 | Hele et al. | 705/4 |
| 2002/0116231 A1* | 8/2002 | Hele et al. | 705/4 |
| 2002/0154634 A1* | 10/2002 | Basso et al. | 370/390 |
| 2002/0161609 A1* | 10/2002 | Zizzamia et al. | 705/4 |
| 2002/0178127 A1* | 11/2002 | Byde et al. | 705/80 |
| 2002/0184116 A1* | 12/2002 | Tam et al. | 705/27 |
| 2002/0198743 A1* | 12/2002 | Ariathurai et al. | 705/4 |
| 2003/0052917 A1* | 3/2003 | Dubovsky | 345/764 |
| 2003/0074229 A1* | 4/2003 | Heise et al. | 705/4 |
| 2003/0084000 A1* | 5/2003 | Ramachandran et al. | 705/59 |
| 2003/0120571 A1* | 6/2003 | Blagg | 705/35 |
| 2003/0120594 A1* | 6/2003 | Shaginaw et al. | 705/40 |
| 2003/0149650 A1* | 8/2003 | Yeh et al. | 705/35 |
| 2003/0158844 A1* | 8/2003 | Kramer et al. | 707/6 |
| 2003/0172039 A1* | 9/2003 | Guy et al. | 705/68 |
| 2003/0187826 A1* | 10/2003 | Kennedy et al. | 707/1 |
| 2003/0204421 A1* | 10/2003 | Houle et al. | 705/4 |
| 2003/0208422 A1* | 11/2003 | Burczyk | 705/35 |
| 2003/0229581 A1* | 12/2003 | Green et al. | 705/38 |
| 2003/0229587 A1* | 12/2003 | Arthus et al. | 705/39 |
| 2004/0010462 A1* | 1/2004 | Moon et al. | 705/39 |
| 2004/0143464 A1* | 7/2004 | Houle et al. | 705/4 |
| 2004/0148201 A1* | 7/2004 | Smith et al. | 705/4 |
| 2005/0055296 A1* | 3/2005 | Hattersley et al. | 705/35 |
| 2005/0187881 A1* | 8/2005 | McGiffin et al. | 705/64 |
| 2006/0100912 A1* | 5/2006 | Kumar et al. | 705/4 |

OTHER PUBLICATIONS

University of Arizona. Human Resources. Supplemental Life Insurance General Information. 2000. p. 1-2.*

Administrator's Guide. IBM Red Brick Warehouse. Version 6.2 Aug. 2002. p. 1-616.*

First Examination Report dated Oct. 18, 2011 for co-pending Indian Patent Application No. 890/MUMNP/2006.

United States Patent and Trademark Office Action dated Oct. 12, 2011 for co-pending U.S. Appl. No. 10/783,478.

* cited by examiner

Figure 16:
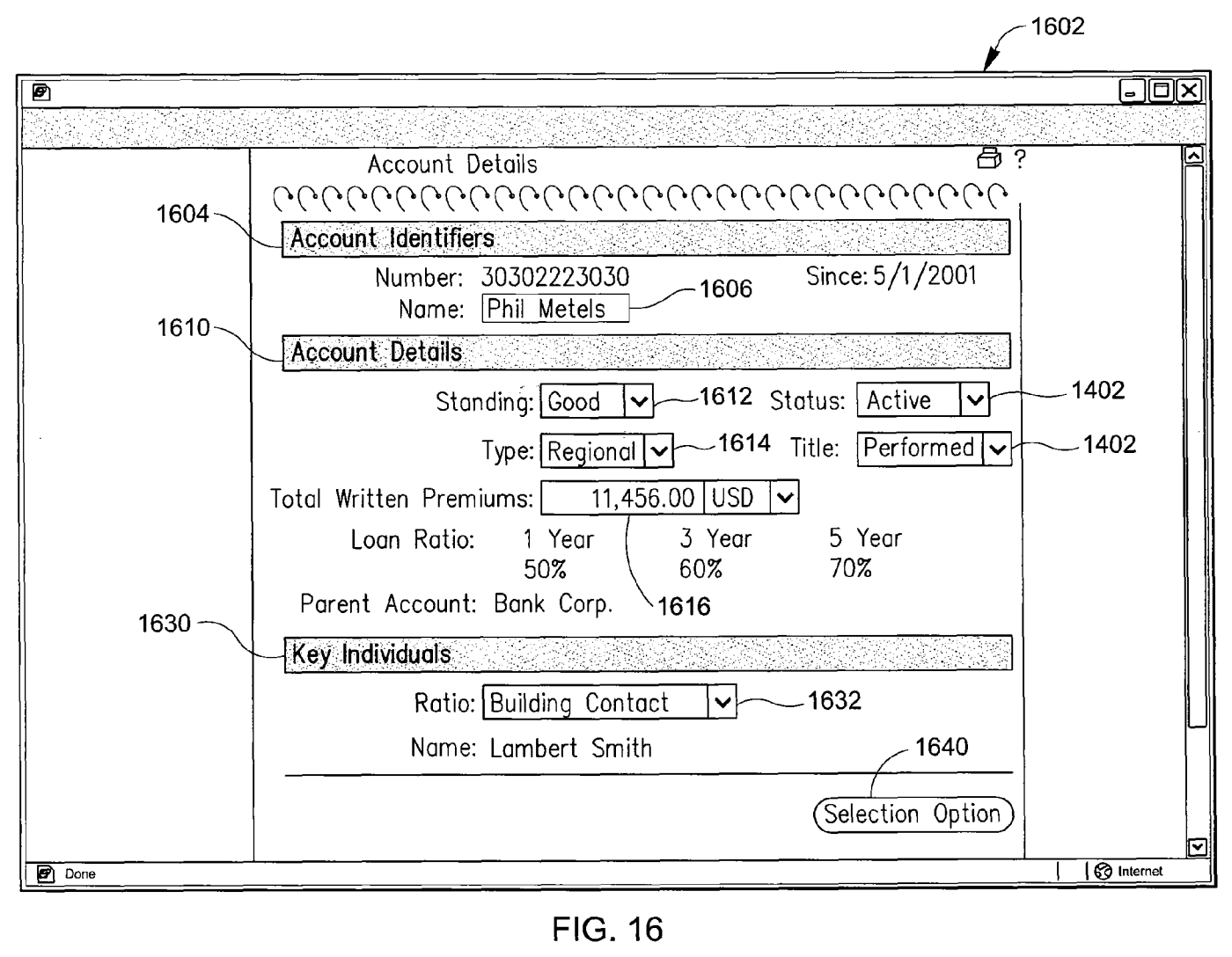

Account Details

Account Identifiers — 1604

Number: 303022223030 — 1606
Name: Phil Metels    Since: 5/1/2001

Account Details — 1610

Standing: [Good ▼] — 1612    Status: [Active ▼] — 1402

Type: [Regional ▼] — 1614    Title: [Performed ▼] — 1402

Total Written Premiums: 11,456.00 USD — 1616

Loan Ratio:  1 Year    3 Year    5 Year
             50%       60%       70%

Parent Account: Bank Corp.

Key Individuals — 1630

Ratio: [Building Contact ▼] — 1632

Name: Lambert Smith (Selection Option) — 1640

Account: "Household"

Participant: "Driver 1"        Premiums
- Homeowners Policy    $10,000
- Auto Policy    $1500
- Personal Excess Policy    $500

Participant: "Driver 2"
- Auto Policy    $1500
- Personal Excess Policy    $500

Participant: "Driver 3"
- Auto Policy    $1500
- Personal Excess Policy    $500

Participant: "Bad Driver"
- Auto Policy    $3500
- Personal Excess Policy    $500

Account: "Household 2"
└── Participant: "Bad Driver"
    ├── Policy 1: Auto ─┐
    └── Policy 2: Homeowners ┘ — "Acceptable"

FIG. 20

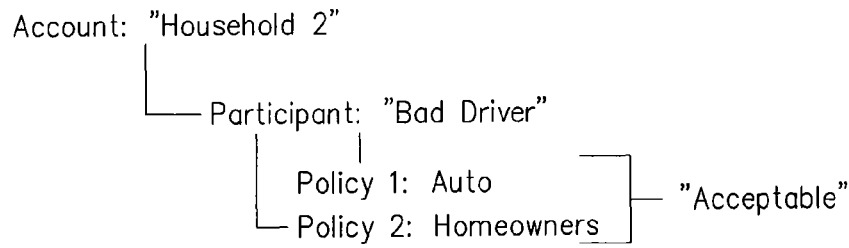

| | Assigned Team Member (Performer) and Role | Task and Target Performer Role |
|---|---|---|
| Account: "ABC" | –John Smith, Regional UW | Referral (Regional UW) |
| └Participant: "A Co." | –Jane Jones, UW | Review D&B Credit Score (UW) |
| Policy 1 | –Jake Jacobs, Rater | Rating (Rater) |
| | –Joe Joseph, UW | Building ITV (UW) |
| └Participant: "B Co." | –Bob Roberts, UW | Review D&B Credit Score (UW) |
| Policy 2 | –Jake Jacobs, Rater | Rating (Rater) |
| | –Clarke Clarkeson, UW | Building ITV (UW) |
| └ Participant: "C Co." | –Tom Thompson, UW | Review D&B Credit Score (UW) |
| Policy 3 | –Jake Jacobs, Rater | Rating (Rater) |
| | –Jack Jackson, UW | Building ITV (UW) |

FIG. 21

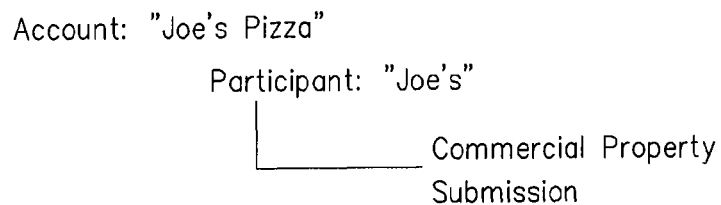

Account: "Joe's Pizza"
  Participant: "Joe's"
    └── Commercial Property Submission

FIG. 22

```
Account: "Steel Co."

Participant: "Steel Sub 1"
        └──────── Boiler Inspection

Participant: "Steel Sub 2"
        └──────── Boiler Inspection

Participant: "Steel Sub 3"
        └──────── Boiler Inspection
```

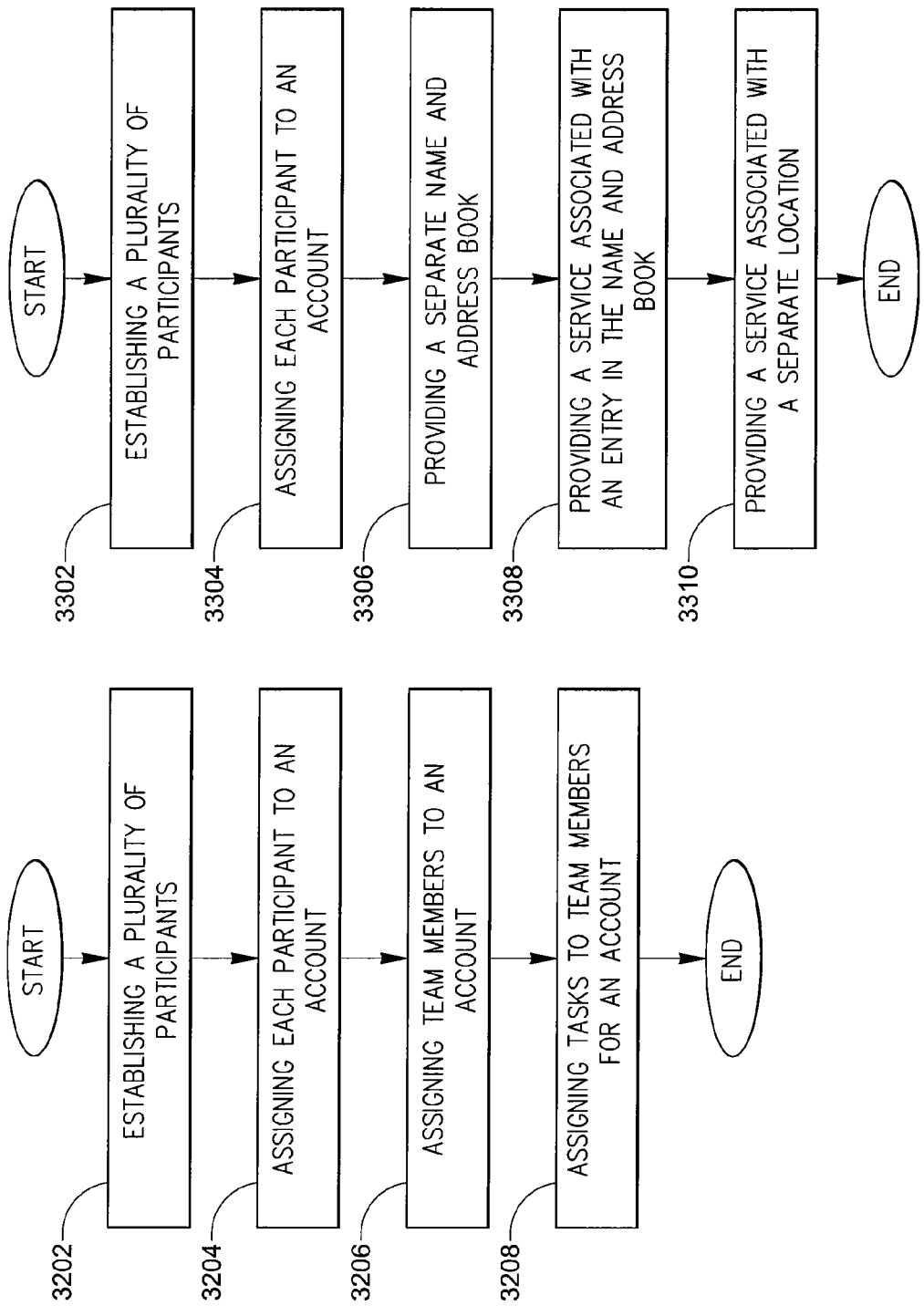

ACCOUNT LEVEL PARTICIPATION FOR UNDERWRITING COMPONENTS

RELATED APPLICATIONS

This application is a continuation of U.S. patent application Ser. No. 10/783,841, filed Feb. 20, 2004, all of which is incorporated herein by reference in its entirety.

BACKGROUND OF THE INVENTION

Background Information

Conventional systems for account management generally lack a holistic approach. Such conventional systems have poor customer data integrity and fail to provide adequate customer insight. They may also provide primitive workflows that are primarily manual, and may be lacking in standardization and codified best practices. Often, information is resident in multiple, isolated systems and paper files, and lacks consistent organization. Information formats may be primarily document-based and, therefore, provide little opportunity for digitization. Customer service may be infrequent and may enable poorly managed customer interactions, limited self-service capabilities, and undifferentiated customer and producer servicing approaches. Finally, these systems lack real-time measurement mechanisms for profit and service performance analysis, but instead include highly manual producer management processes.

In the field of insurance underwriting, the systems that support and enable the related activities have a particularly acute problem with regard to account management. In addition to the issues previously discussed, insurance underwriting has several other issues that result from the lack of a holistic approach to account management. For example, insurance underwriting includes tasks, such as the ordering of credit reports or loss control surveys that are reactive in the application/underwriting review process. Additionally, working interfaces with other systems, such as agency management systems, often do not exist. Further, viable data feeds into policy rating/issuance systems are often lacking. As a further complication, underwriting appetites also are not clearly articulated or consistently executed because conventional systems provide limited executional capabilities supporting account and activity management. In addition, they also lack rigorous segmentation methodologies to develop unique approaches to product and underwriting rules.

Accordingly, there is a need for an improved system and data structure for account management.

SUMMARY

An account management system has been developed that enables customer or client-related information to be stored, viewed and manipulated in a manner that reflects the relationship among different customers and clients (hereinafter the term "customer" will refer to both customers and clients). The account management system includes a data structure that defines accounts and relates customers to accounts (an "account data structure") so that the accounts include a group of related customers (customers that are included in an account may be referred to as "participants"). This enables relationships among customers, such as families and complex business organizations, to be represented in an efficient and easy to access manner. In addition, the account data structure allows relationships to be established among accounts, which enables even more complex business and other relationships to be represented. Further, the account data structure defines offerings, which enable not only products and services, but also packages combining products and services to be represented. In addition, the account data structure relates offerings to customers. These relationships, together with the relationships formed with accounts, enable related customers and their associated products and services to be linked together under a single account or account group. The account data structure may further store task-related and provider-related information in a manner that enables application programs to generate tasks and assign performers to these tasks in connection with accounts.

In general, the account data structure is based on a relational data model and may include an account entity class, an offering entity class, a customer entity class, an account involvement entity class, and an offering involvement entity class. The account entity class stores individual instances of account-related information ("account data objects") and the customer entity class stores individual instances of customer-related information ("customer data objects"). The account entity class and the customer entity class are linked through the account involvement entity class. The account involvement entity class stores involvements that establish relationships among customer data objects and account data objects. Similarly, the offering entity class and the customer entity class are linked through the offering involvement entity class, which establishes relationships among customer data objects and individual instances of offering related information ("offering data objects"). The account data structure may further include a provider entity class and a task entity class. The provider entity class includes entities that store individual instances of information relating to the providers of offerings ("provider data objects"). The task entity class includes entities that store individual instances of information relating to tasks associated with providing the offerings ("task data objects"). The entities in the task and provider entity classes may be linked to other entities in the account data by application programs.

The account data structure enables business rules to be written an implemented for related customers and groups of customers. These business rules may be in the form of application programs that manage an underwriting account for an insurance policy. In particular, a method comprises the steps of establishing a plurality of participants; assigning each participant of the plurality of participants to an account; establishing business rules at an account level; and providing an underwriting decision for an account based upon the business rules. According to an alternate embodiment, a method of managing an underwriting account for an insurance policy comprises the steps of establishing a plurality of participants; assigning each participant of the plurality of participants to an account; assigning team members to the account; and assigning tasks to team members for a participant for the account. According to a further alternate embodiment, a method of managing an underwriting account for an insurance policy comprises the steps of establishing a plurality of participants; assigning each participant of the plurality of participants to an account; providing a separate name and address book separate from the pluralities of participants of the account; and providing a service associated with an entity in the name and address book.

BRIEF DESCRIPTION OF THE DRAWINGS

The invention can be better understood with reference to the following drawings and description. The components in the figures are not necessarily to scale, emphasis instead being placed upon illustrating the principles of the invention. In the drawings:

FIG. 16 is an exemplary webpage showing an account folder according to the present invention;

FIG. 20 is a tree diagram showing a decision process based upon an account having a three tiered structure according to the present invention;

FIG. 21 is a tree diagram showing assigned team members and tasks according to the present invention;

FIG. 22 is a tree diagram showing an example of different types of information required for a three tiered structure according to the present invention;

FIG. 32 is a flow chart showing a method of assigning team members and tasks to an account according to the present invention; and FIG. 33 is a flow chart showing a method of providing services based upon a separate name and address book according to the present invention.

DETAILED DESCRIPTION OF THE PREFERRED EMBODIMENTS

Figure 1:
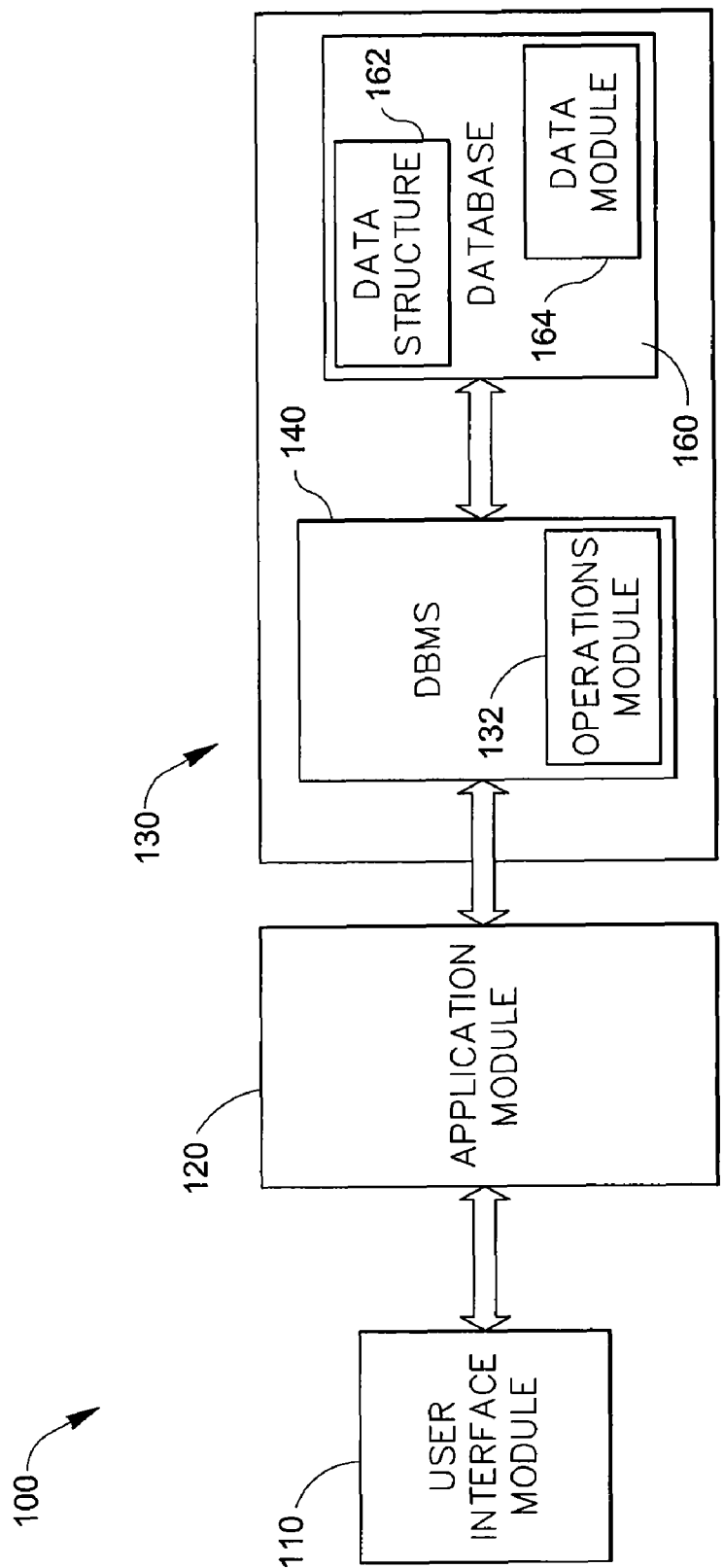
FIG. 1 is a block diagram of an account management system.

An example of an account management system is shown in FIG. 1. The account management system 100 may include: a user interface module 110; an application module 120; and a database system 130. The database system 130 may include a database management system ("DBMS") 140; and a database 160. In general, the database 160 includes at least one computer-readable memory in which a data module 164 and a data structure 162 may reside. The data structure 162 (also referred to as the "schema" or the "meta structure") defines the permissible data types, permissible arrangements of data, and the relationships among the data. The data module 164 stores the actual units of information (the "data objects") in accordance with the data structure.

In general, the DBMS 140 is used to create and maintain the database 160. More specifically, the DBMS 140 enables the creation, modification, and protection of and access to the database 160. The DBMS 140 includes an operations module 132 that stores a list of permitted operations and a collection of general integrity tools. The permitted operations are the operations that may be implemented on the database 160. The general integrity tools maintain the accuracy of the data in the database 160. These general integrity tools may include the use of foreign and primary keys indexes in data entities. With these indexes, referential integrity can be enforced. The DBMS 140 may also include a data description language ("DDL") and a data manipulation language ("DML"). The DDL generally includes a collection of statements for the description of data types that may be used to define the data structure. The DML generally includes a collection of the permissible operators for the data types defined in the data structure.

The user interface module 110 generally serves as an interface to the database 130, to which it may be directly or indirectly coupled through the application module 120. The user interface module 110 may reside remotely or on the same device as the application module 120 and/or the database system 130. The user interface module 110 may be any type of computer or terminal capable of digital communication and may communicate with the application module 120 and the database system 130 using any type of electromagnetic communications via any type of electromagnetic channel or network.

The user interface module 110 generally includes a self-contained language ("SQL") or a host language or legacy system for communicating with the database system 130. These languages enable communication with the database using the permitted operations (these may be defined by DML operators). The permitted operators are communicated to the DBMS 140, which converts them into one or more permitted operations. These permitted operations are communicated to the database 160 in which they access and/or manipulate the data.

The application module 120 may include a memory device, a processor, and software or other digital instructions. The application module 120 may reside on the user interface module 110 or, as shown in FIG. 1, on a remote device, such as a server, memory or the like. The application module 120 may communicate with the user interface module 110 using any type of electromagnetic communications via any electromagnetic channel or network. The application module 120 may include application programs, including account-based application programs, which utilize and/or manipulate the data in the database 160. These account-based application programs include database transactions as well as computer instructions or software code that converts the database transactions into sets of corresponding permitted operations for communication with the database system 130.

The user interface module 110, application module 120 and the database system 130 may, separately or in any combination, include an input device and an output device (not shown). The output device may be any type of visual, manual, audio, electronic or electromagnetic device capable of communicating information from a processor or memory to a person or other processor or memory. Examples of output devices include, but are not limited to, monitors, speakers, liquid crystal displays, networks, buses, and interfaces. The input device may be any type of visual, manual, mechanical, audio, electronic, or electromagnetic device capable of communicating information from a person, or memory to a processor or memory. Examples of input devices include keyboards, microphones, voice recognition systems, trackballs, mice, networks, buses, and interfaces. Alternatively, the input and output devices may be included in a single device such as a touch screen, computer, processor or memory coupled with the processor via a network. The user interface module 110, application module 120 and the database system 130, separately or in any combination, may further include one or more processors and one or more computer-readable memory devices (not shown). The memory devices may be any type of fixed or removable digital storage device and, if needed, a device for reading the digital storage device including, floppy disks and floppy drives, CD-ROM disks and drives, optical disks and drives, hard-drives, RAM, ROM and other such devices for storing digital information. The processor may be any type of device or devices used to process digital information.

Account Data Structure

Data objects may be structured or organized in the database 160 of the database system 130 in accordance with a type of data structure 162, referred to in this document as an "account data structure." In general, the account data structure is based on a relational data model and may include a collection of entity classes and the relationships among them. An example of an account data structure is shown generally in FIG. 2. In this figure, each block represents a group of one or more related entities (an "entity class"). The account data structure 200 may include: an account entity class 210; a customer entity class 220; an offering entity class 230, an account involvement entity class 240 and an offering involvement entity class 250. Relationships among individual instances of the entities in the account entity class ("account data objects") and individual instances of the entities in the customer entity class ("customer data objects") are established and defined by individual instances of the entities in the account involvement entity class ("account involvements") 240. The account involvement entity class may define a one-to-many relationship between an account data object and a customer data object. Therefore, an account data object may include many customer data objects. Similarly, relationships between customer data objects and individual instances of the entities in the offering entity class ("offering data object") are established and defined by individual instances of the entities in the offering involvement entity class ("offering involvements") 250. The offering involvement entity class may define a one-to-many relationship between an offering data object and a customer data object. Therefore, an offering data object may include many customer data objects. Each entity class generally contains one or more entities, each entity including at least one attribute. These attributes may include, for example, numbers, letters and/or other symbols alone or in any combination. In the descriptions that follow, specific attributes are discussed in relation to each entity. However, each entity may include any number and combination of attributes.

Figure 3:
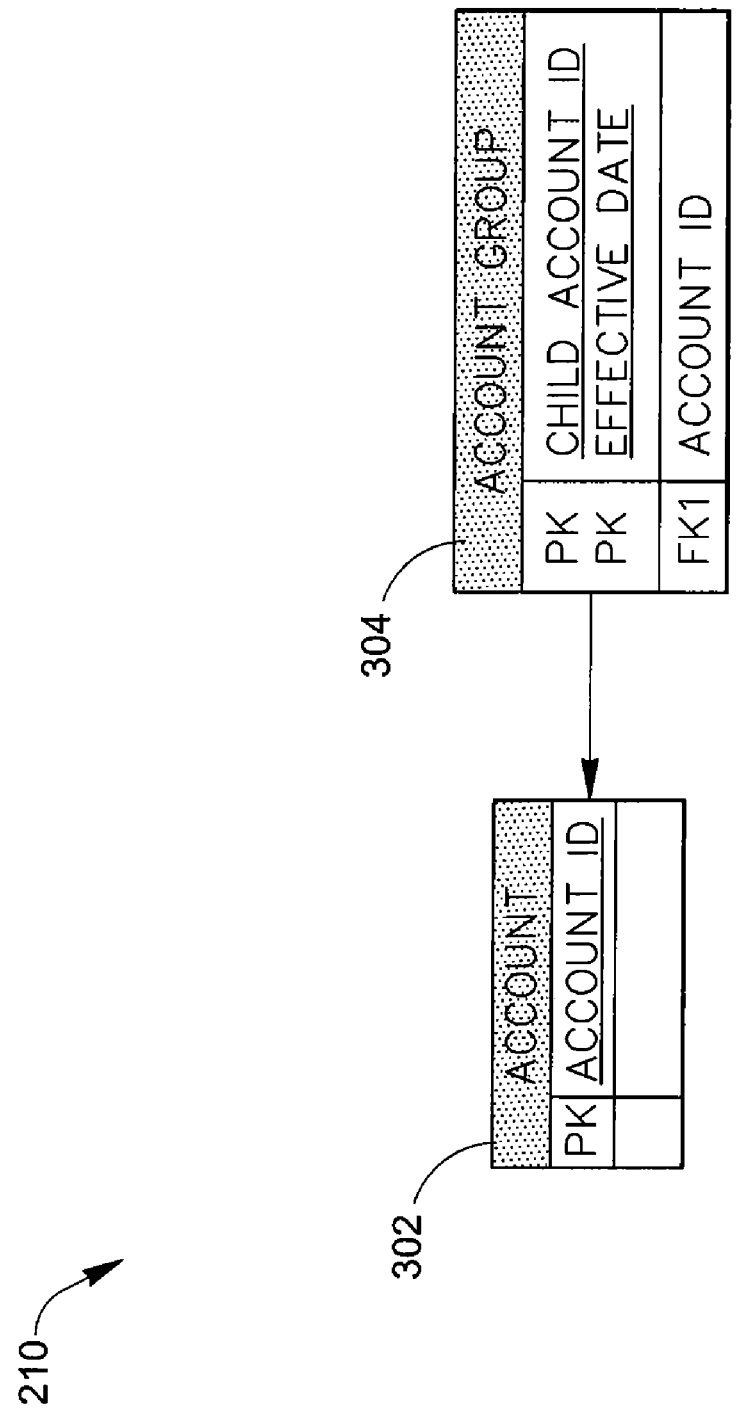
FIG. 3 is an entity-relationship diagram of an account entity class.

The account entity class 210 is shown in more detail in FIG. 3 and may include an account entity 302. In this figure, the blocks with shading represent entities. The account entity class 210 may further include an account group entity 304. In general, the account entity 302 may store information relating to a group of one or more customers among which, a relationship has been formed by the account involvement entity class (discussed below). The account entity may include an account ID attribute as a primary key that uniquely identifies each account data object. The account group entity 304 may store information relating to groups of two or more accounts data objects and enables relationships to be formed among the two or more account data objects. Each instance of the account group entity 304 (each an "account group data object") establishes a relationship among two or more account data objects as an account group. The account group entity allows a parent-child relationship to be created between account data objects. As such, each account data object may have one and only one "parent" account data object. However, one parent data object may have one or more "child" or "children" account data objects. As such, many account data objects can be related to one another by defining for each a common parent account data object. In general, the account group entity 304 may include a child account ID attribute as a primary key that uniquely identifies each account group data object. In addition, the account group entity 304 may include other attributes as primary keys, such as the "effective date" attribute shown in FIG. 3. The account group entity 304 establishes an account data object 302 as the parent by defining the account ID of the account data object as a foreign key in an account group data object. A second account data object is related to the parent as a child data object by placing the account ID of the second account data object in the child account ID field. Similarly, other account data objects may be included in the same account group by including their account IDs in the child account ID field of other account group data objects that also include the account ID of the same parent account data object as a foreign key.

Figure 4:
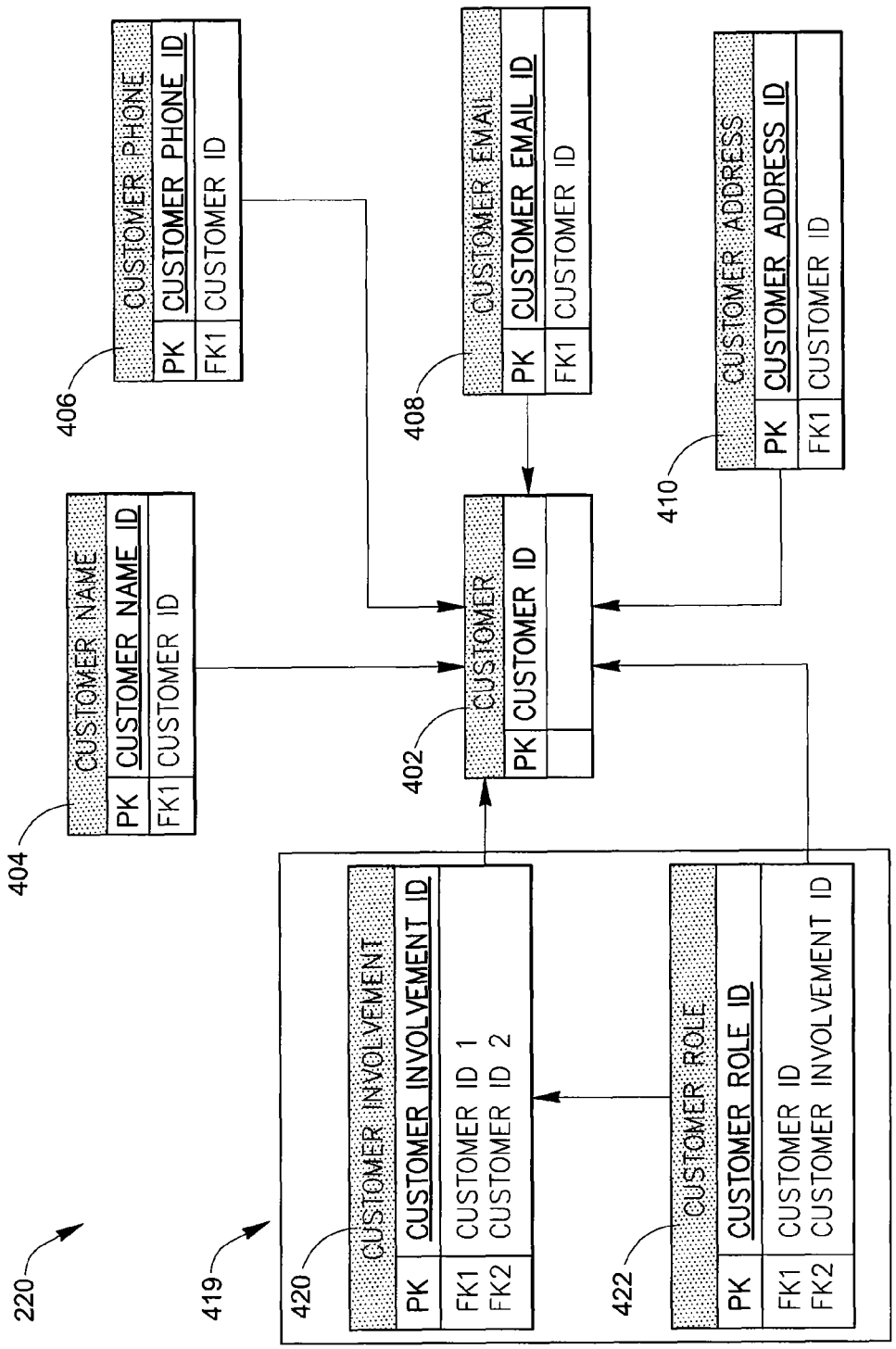
FIG. 4 is an entity-relationship diagram of a customer entity class.

The customer entity class 220 is shown in more detail in FIG. 4. In this figure, the blocks with shading represent entities, while the block without shading 419 represents an entity class. The customer entity class 220 may include one or more entities for storing different aspects of customer-related information. For example, as shown in FIG. 4, the customer entity class 220 may include: a customer entity 402; a customer name entity 404; a customer phone entity 406; a customer email entity 408; and a customer address entity 410. However, the customer entity class 220 may include any number and combination of entities. Each of the entities 402, 404, 406, 408, and 410 may store a particular aspect of customer-related information (each a customer data object) that are linked together via a customer ID attribute. The customer entity 402 may include the customer ID attribute as its primary key. It may also include other attributes such as customer type (such as individual or business entity), customer status, legacy system identification, and legacy system. The customer name 404, customer phone 406, customer email 408, and customer address 410 entities store name, phone number, email, and address data objects, respectively. These entities may also include the customer ID attribute as a foreign key, which provides a link to the customer entity 402. Each customer data object may have associated with it more than one customer name, phone number, email, and/or address data objects.

The customer entity class 220 may further include a customer involvement entity class 419. The customer involvement entity class 419 may include entities that store and define a customer involvement. Customer involvements establish relationships among two or more customer data objects. The customer involvement entity class 419 generally includes: a customer involvement entity 420 and a customer role entity 422. The customer involvement entity 420 may include a customer involvement ID attribute as a primary key and at least two customer IDs as foreign keys. Customer ID1 is an attribute representing the customer ID attribute for one of the customer data objects and customer ID2 is an attribute representing the customer ID attribute for another of the customer data objects. When the customer IDs for two different customer data objects are indicated in this manner, a customer involvement is created that establishes a relationship among the customer data objects with the indicated customer IDs. Customer roles may be established for customer data objects with regard to one or more other customer data objects when a customer involvement is created. The customer role entity 422 may include a customer role ID attribute as a primary key and a customer ID attribute and customer involvement ID attribute as foreign keys. A particular instance of a customer role ID attribute is thereby associated with the customer data object identified by the customer ID attribute. The customer role ID attribute may indicate a role such as employer or employee.

Figure 2:
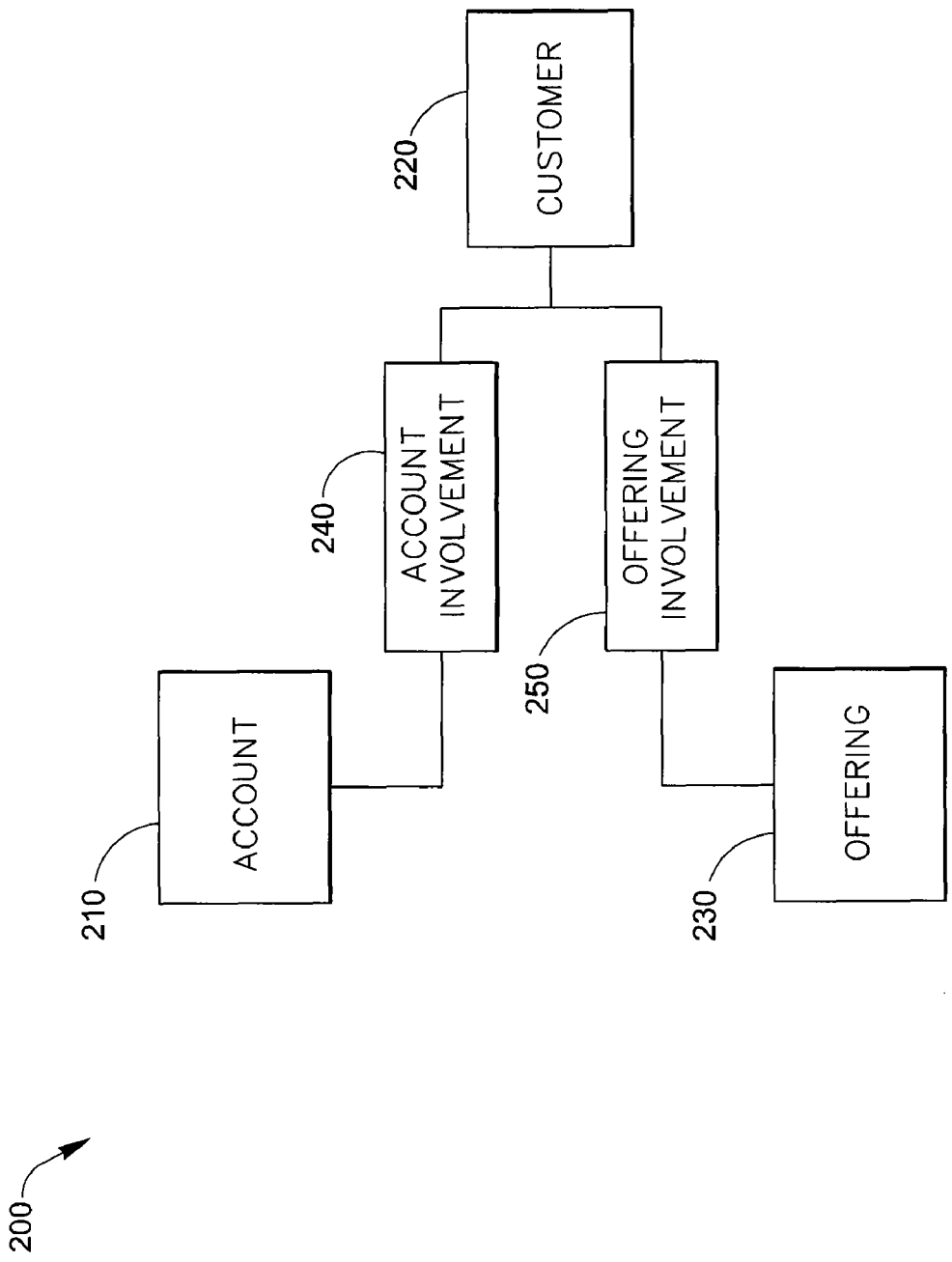
FIG. 2 is a block diagram of an account data structure.
Figure 5:
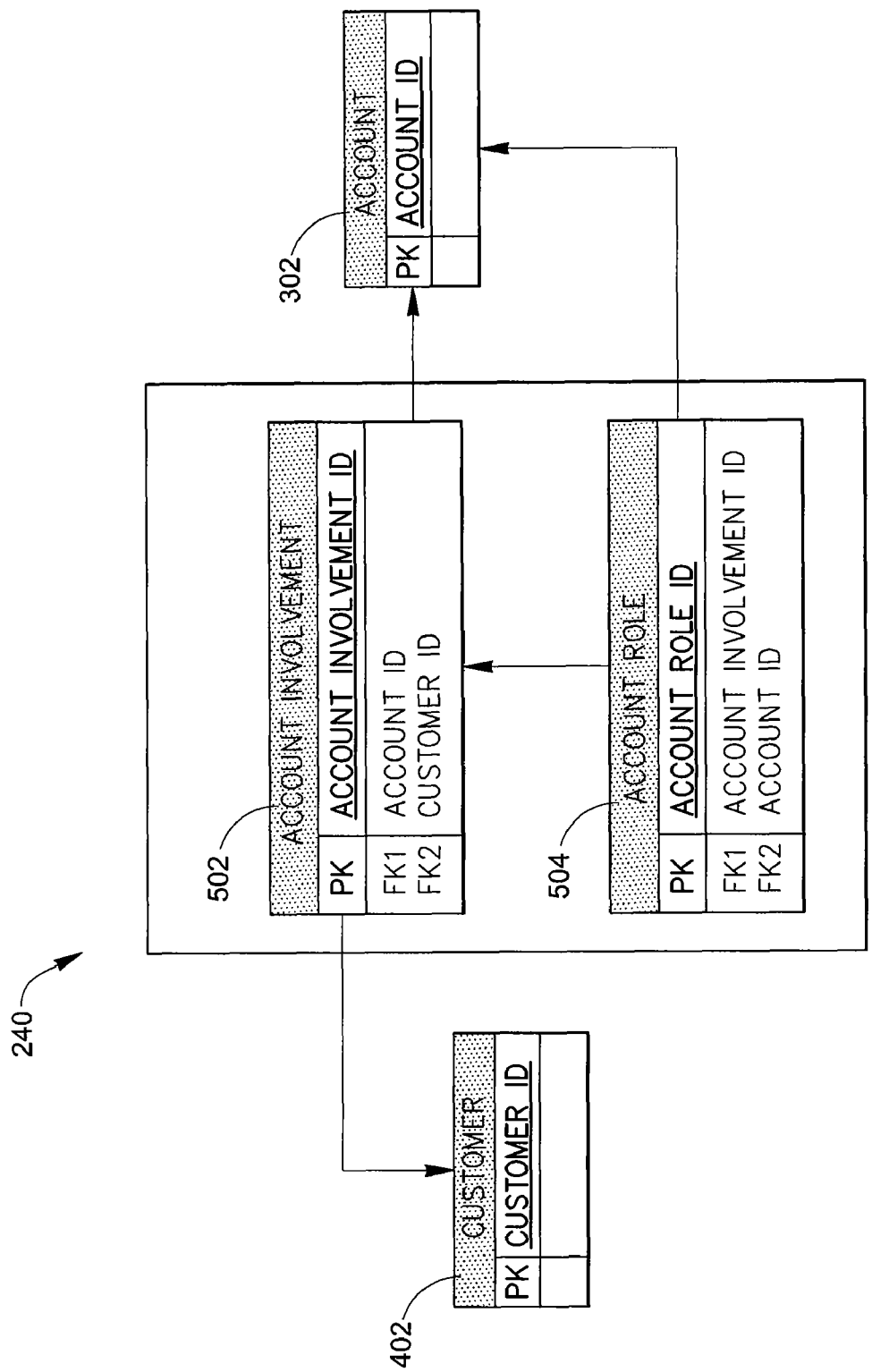
FIG. 5 is an entity-relationship diagram of an account involvement entity class and its relationship with a customer entity class and an account entity class.

Details of the account involvement entity class 240 of FIG. 2 are shown in more detail in FIG. 5. In this figure, all the blocks represent entities. The account involvement entity class 240 may include one or more account involvements that each establishes a relationship among one or more customer data objects and an account data object. The account involvement entity class 240 may include: an account involvement entity 502 and an account role entity 504. The account involvement entity 502 may include an account involvement ID attribute as a primary key, and one or more customer ID attributes (only two are shown) as foreign keys. Thus the account involvement entity 502 is linked to the customer and account entities 402 and 302, respectively. When specific customer ID attributes (each a "customer ID") and a specific account ID attribute (an "account ID") are indicated, an account involvement is created that establishes a relationship among the customer data objects identified by the indicated customer IDs and the account data object identified by the indicated account ID. Additional customer data objects may be associated with an account data object by creating a relationship between the additional customer data objects and the account data object in the manner described. Account roles may be established for customer data objects with regard to account data objects when an account involvement is created. Account roles define the role of a customer data object with regard to a particular account data object. Examples of roles include insured, primary contact, and household member. The account role entity 504 may include an account role ID attribute as a primary key and an account involvement ID attribute as a foreign key.

Referring again to FIG. 2, the offering entity class 230 may store information related to offerings. Offerings include any product, good, service, or combination thereof that may be offered to, sold to, and/or serviced for customers and/or potential customers. The offering entity class 230 may include one or more offering entities that each may store an aspect of this information. Individual instances of these offering entity classes are referred to as "offering data objects." The nature and number of the offering entities may be a function of the types of offerings and thus, the types of offering data objects involved. However, the structure of the offering entity class 230 is such that information relating to an offering throughout the various stages of its life cycle may be stored together. One way that this is accomplished is by including attributes within the offering entities that capture information relating to the various stages of the life cycle of the offering.

Figure 6:
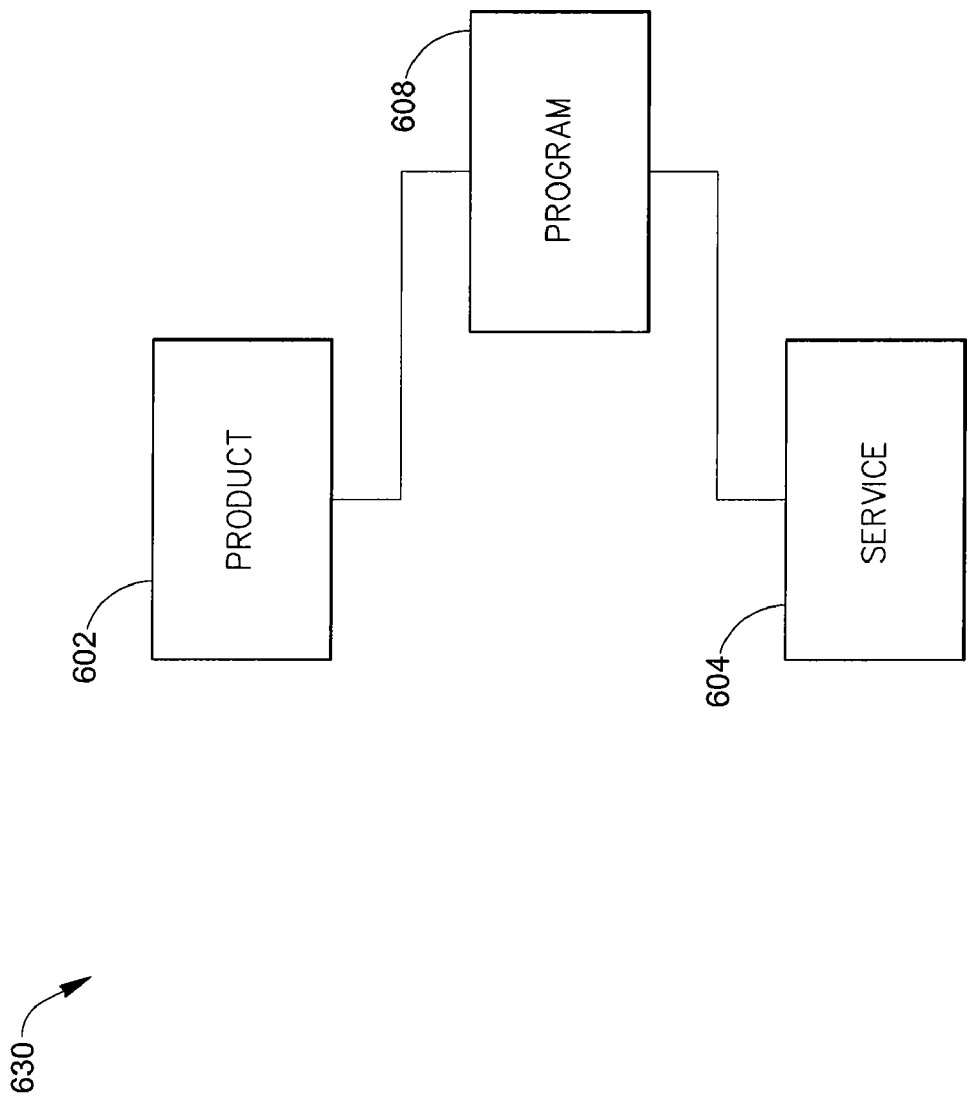
FIG. 6 is a block diagram of an offering entity class.

An example of an offering entity class is shown in FIG. 6 and indicated by reference number 630. In this figure, each block represents an entity class. However, the offering entity class may be implemented to reflect any type of offering to a customer. The offering entity class 630 may include a product entity class 602, a service entity class 604, and a program entity class 608. The product entity class 602 may include one or more entities that store information relating to products offered by providers. The service entity class 604 may include one or more entities that store information relating to services offered by providers. The program entity class 608 may include one or more entities that establish relationships among the offering data objects stored in the product entity class 602 ("product data objects") and the offering data objects stored in the service entity class 604 ("service data objects"). Therefore, the program entity class 608 enables the representation of bundled products and services.

Figure 7:
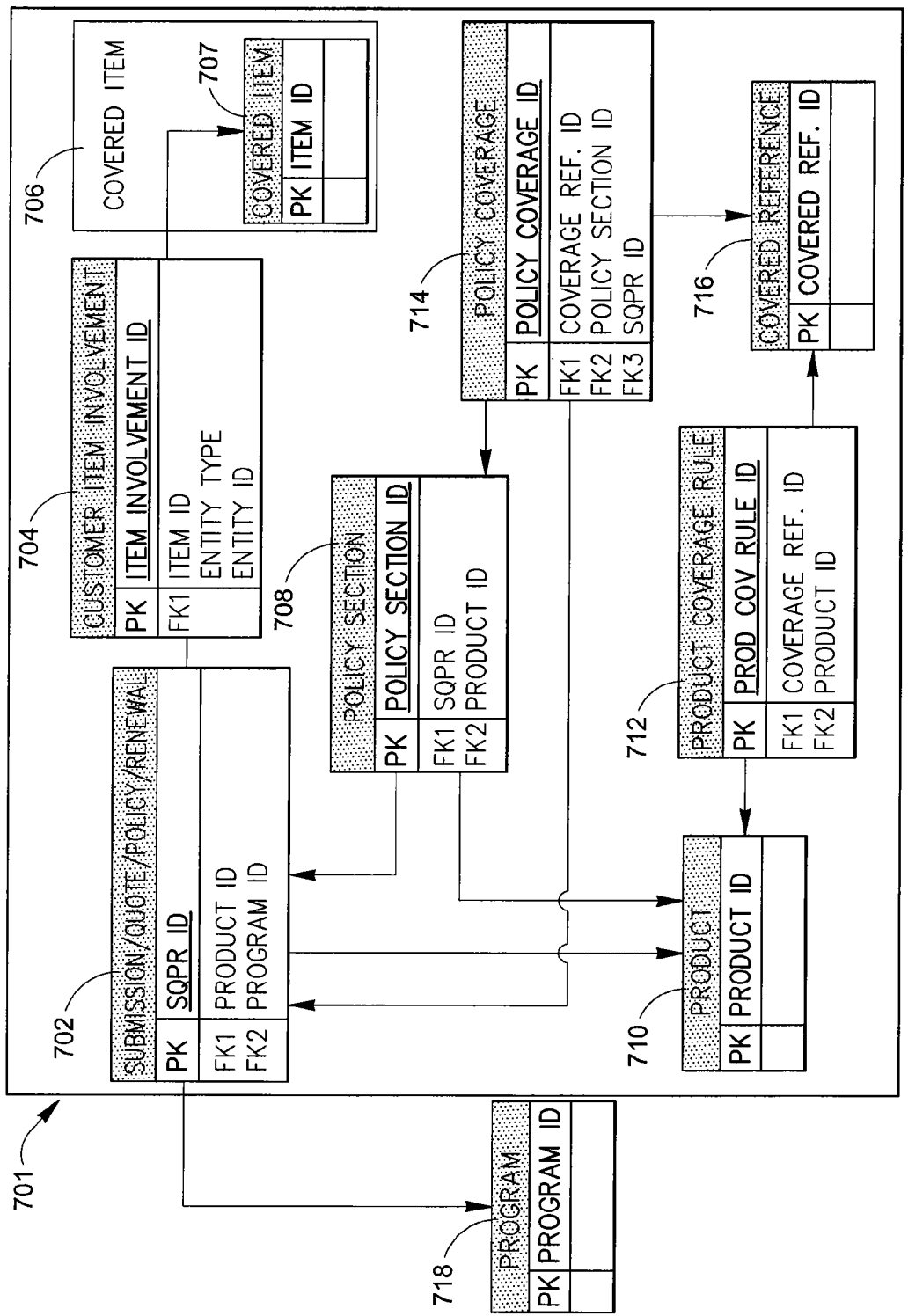
FIG. 7 is an entity-relationship diagram of an offering entity class and its relationship with a program entity.

For the purposes of example, FIG. 7 shows an example of a product entity class for insurance-related offerings 701. However, the product entity class may be implemented to represent any type of product. In this figure, block 706 represents an entity class, while all the other blocks represent entities. The product entity class of FIG. 7 may include a product entity 710. The product entity 710 holds information relating to the various insurance policies offered by insurance providers to customers. Generally each instance of the product entity 710 holds information relating to a different product, such as different policy types. These policy types may include a homeowner policy, an automotive policy, a commercial property policy, a workers compensation policy, and a business owner's policy. The product entity 710 may include a product ID attribute as a primary key that uniquely identifies each type of policy (a "policy data object").

The product entity class 701 may also include an entity that stores information reflecting the various life cycle stages of an insurance offering—the submission/quote/policy/renewal or SQPR entity 702. The SQPR entity may include an SQPR ID attribute as a primary key that uniquely identifies individual instances of the SQPR entity (an "SQPR data object"). The SQPR ID attribute may also uniquely identify a particular instance of the offering and a SQPR data object may correspond to a particular instance of the offering for a particular customer data object. Depending on the current stage of the SQPR data object's lifecycle, the SQPR data object may be referred to as a "submission" (a request by a customer for a policy), "quote" (a quote to a customer of the cost and terms of a policy), a policy itself, or a "renewal" (the reissue of a policy for which the terms will expire within a defined time period). In general, a submission may become a quote once a quote to a customer of the cost and terms of a policy has been created. A quote may become a policy once the customer accepts the quote. A policy may become a renewal when the terms of the policy will expire within a defined time period. The renewal may again become a policy if accepted by a customer. Because a renewal is a later stage of an existing policy, it may not need to return to the submission or quote stages. In addition, the product entity class may include pre-submissions as prospects. Pre-submissions and prospects are potential customers targeted for acquisition (also referred to as "leads"). The SQPR entity 702 may also include other attributes for storing information relating to each of the stages of the lifecycle of a policy data object, such as: status, risk grade, premium, and bill type. In addition, the SQPR entity 702 may include a product ID attribute and/or a program ID attribute (identifying a particular instance of a program, discussed below), which establishes a relationship between SQPR data objects and the particular product and/or program, respectively, that are to provide coverage for the individual SQPR data objects.

The product entity class 701 may also include a policy section entity 708, policy coverage entity 714, coverage reference entity 716, and a product coverage rule entity 712. The policy section entity may be used to define complex products, such as a product that includes multiple products. For example, a "Commercial Package" product may be a combination of other products (which may each be referred to as a "section") such as: General Liability, Commercial Property, Inland Marine, and Commercial Crime. The policy section entity 708 may have a policy section ID attribute as a primary key that uniquely identifies each instance of a complex product (each a "policy section data object"). It may also have one or more product ID attributes corresponding to the products to be included in the complex product. The policy section entity 708 may also include an SQPR ID attribute as a foreign key. This provides a link to the SQPR entity 702, which identifies the life cycle stage of the offering.

The policy coverage entity 714 defines the types of coverage provided by a particular product. For example, a product such as a homeowner's policy may include the following types of coverage: dwelling, contents, and liability. All policies may not have all types of coverage or even the same types of coverage. The policy coverage entity 714 captures the relevant type or types of coverage and links them to a particular product. The policy coverage entity 714 may include a policy coverage ID attribute as a primary key that uniquely identifies a particular instance of a coverage (a "policy coverage data item"). It may also include a policy section ID attribute and/or an SQPR ID attribute as foreign keys, which provide links to the policy section entity 708 and the SQPR entity 702, respectively. The policy coverage entity 714 may further include one or more coverage reference IDs as foreign keys, which link the policy coverage entity 714 to a coverage reference entity 716.

The coverage reference entity 716 includes the coverage reference ID attribute as a primary key. The coverage reference ID attribute uniquely identifies a particular type of coverage. The coverage reference entity 716 may also store general attributes related to a particular type of coverage that are common to all instances of that type of coverage.

The product coverage rule entity 712 is generally used to drive the valid types of coverage for a product. The product coverage rule entity 712 may include a product coverage rule ID attribute as a primary key that uniquely identifies a particular instance of the product coverage rule entity (a "product coverage rule data object"). It may also include a product ID attribute and one or more coverage reference ID attributes as foreign keys. In this manner, the product coverage rule entity 712 links products with the types of coverage that are valid for that product. In addition, the product coverage rule entity 712 may include other attributes designed to capture additional information relating to a type of coverage, such as: the state or states and/or country or countries in which the type of coverage is valid.

In addition, the product entity class may include a covered item entity class 706 that stores information relating to a particular item or situation that is to be covered by the product, program or service and that is the subject of the SQPR. The product entity class may also include a covered item involvement entity 704 that establishes relationships between SQPR data objects and individual instances of the covered item entity class (each a "covered item data object"). The covered item involvement entity 704 may include an entity type attribute and an entity ID attribute. These attributes enable a relationship to be formed between the covered item involvement entity 704 and an entity in the offering, account, or customer entity classes (see FIG. 2, reference numbers 230, 210, and 220, respectively). The entity type attribute may contain information that identifies the entity class to which the covered item involvement entity 704 has a relationship. The entity ID attribute identifies the particular attribute in the entity class with which the covered item involvement entity 704 has a relationship. This attribute provides a link with the particular SQPR data object that includes the ID of the data object containing the identified attribute. Links may be formed between the covered item involvement entity 704 and other entities in the account data structure in other ways. For example, the entity ID attribute may be included in the covered item involvement entity 704 as a foreign key indicating the attribute in the entity to which the covered item involvement entity 704 is to be linked.

Figure 8:
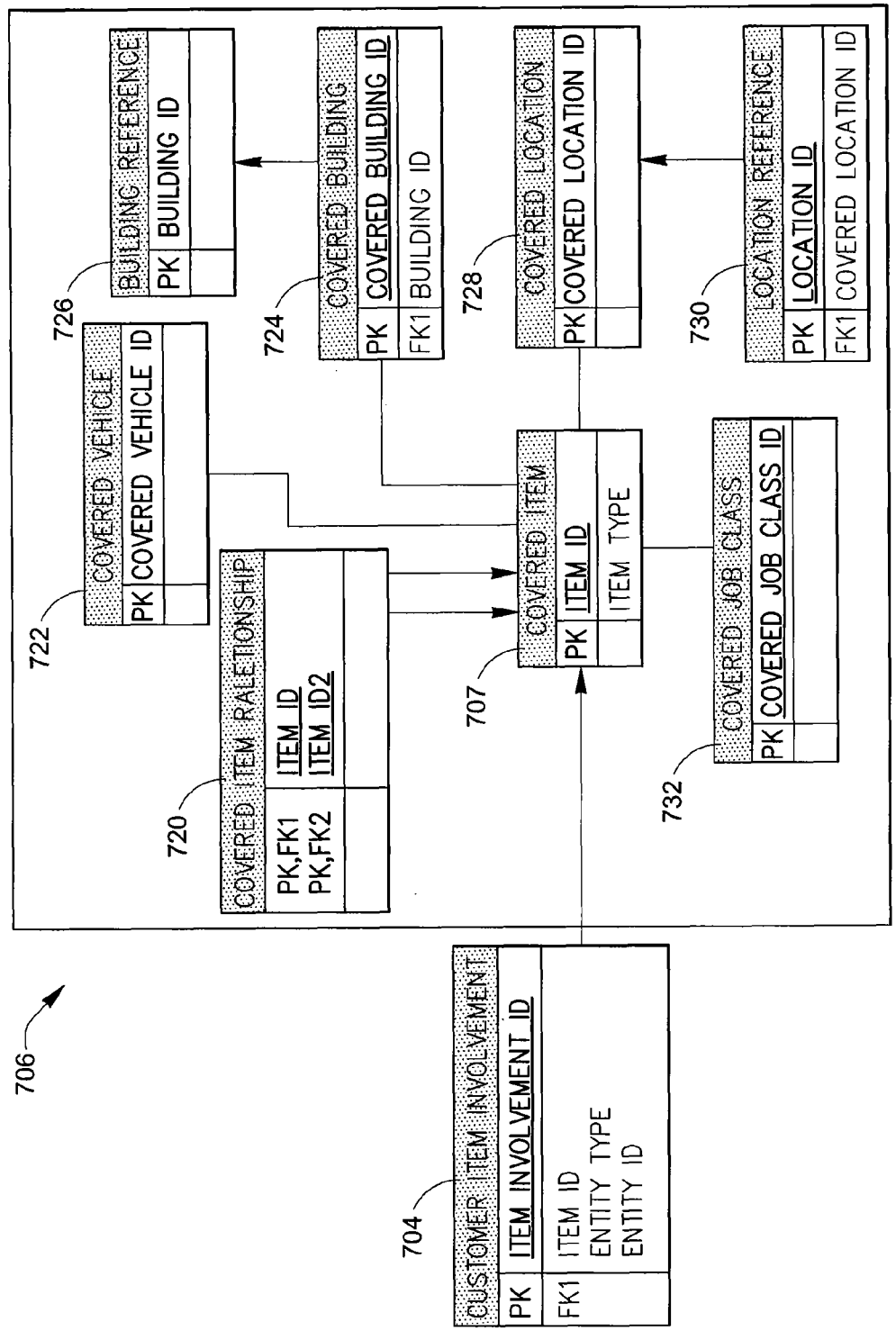
FIG. 8 is an entity-relationship diagram of a covered item entity class and its relationship with a covered item involvement entity.

An example of a covered item entity class 706 is shown in more detail in FIG. 8. In this figure, all the blocks represent entities. The covered item entity class 706 is shown in terms of its relation to the covered item involvement entity 704 and may include a covered item entity 707. The covered item entity may include an item ID attribute that uniquely identifies each instance of itself (each a "covered item data object"). The covered item entity 707 may be linked to the covered vehicle 722, covered building 724, covered location 728, and covered job class 732 entities. In one example, these entities may be linked by setting them up in a generalization hierarchy. A generalization hierarchy establishes a relationship among entities in which many entities (the "sub-types") are defined as refined versions of a single entity (the "super-type"). In this hierarchy, an entity includes both the super-type and the relevant sub-type. The sub-types inherit all the attributes of the super-type, including its primary key. Attributes common to all the sub-types are assigned to the super-type and attributes unique to a sub-type are assigned to that subtype. The super-type includes an attribute (referred to as the "discriminator") whose values identify the appropriate sub-type. For example, the covered item entity 707 may be the super-type, while the covered vehicle 722, covered building 724, covered location 728, and covered job class 732 entities are the sub-types. The covered item entity 707 may include an item type attribute as the discriminator, the value of which determines which of the sub-types are applicable. For example, the value for the item type attribute may indicate that the covered item is a covered vehicle. The sub-types (covered vehicle 722, covered building 724, covered location 728, and covered job class 732 entities) each may include attributes that store information relating to a particular type of covered item and may include a covered vehicle ID attribute, covered building ID attribute, covered location ID attribute, and covered job class ID attribute, respectively, as a primary key. These primary keys will inherit the value of the item ID attribute (the covered item entity 707) and thus are also foreign keys. These primary keys serve as unique identifiers for individual instances of each of these entities.

The covered building 724 and covered location 728 entities separately store information relating to building structures and physical location, respectively. Each of these entities includes attributes relating to aspects of their particular item type, which allows information relating to a building and the land on which it sits to be separately stored and described. The covered item entity class 706 may also include a building reference entity 726 that includes further attributes for building-type covered entities. The building reference entity 726 may also include a building ID attribute as a primary key. This building ID attribute may also be included in the covered building entity 724 as a foreign key to establish a relationship between individual instances of the covered building entity 724 (each a "covered building data object") and the building reference entity 726 (each a "building reference data object").

In a similar manner, the covered item entity class 706 may also include a location reference entity 730 that includes further attributes for location-type covered entities. The location reference entity 730 may also include a location ID attribute as a primary key. This location ID attribute may also be included in the covered location entity 728 as a foreign key to establish a relationship between individual instances of the covered location entity 728 (each a "covered location data object") and the location reference entity 730 (each a "location data object"). The covered item entity class 706 may also include a covered item relationship entity 720. The covered item relationship entity 720 may establish a relationship among two or more covered item data objects by including two item ID attributes referencing two different covered item data objects as primary keys.

Figure 9:
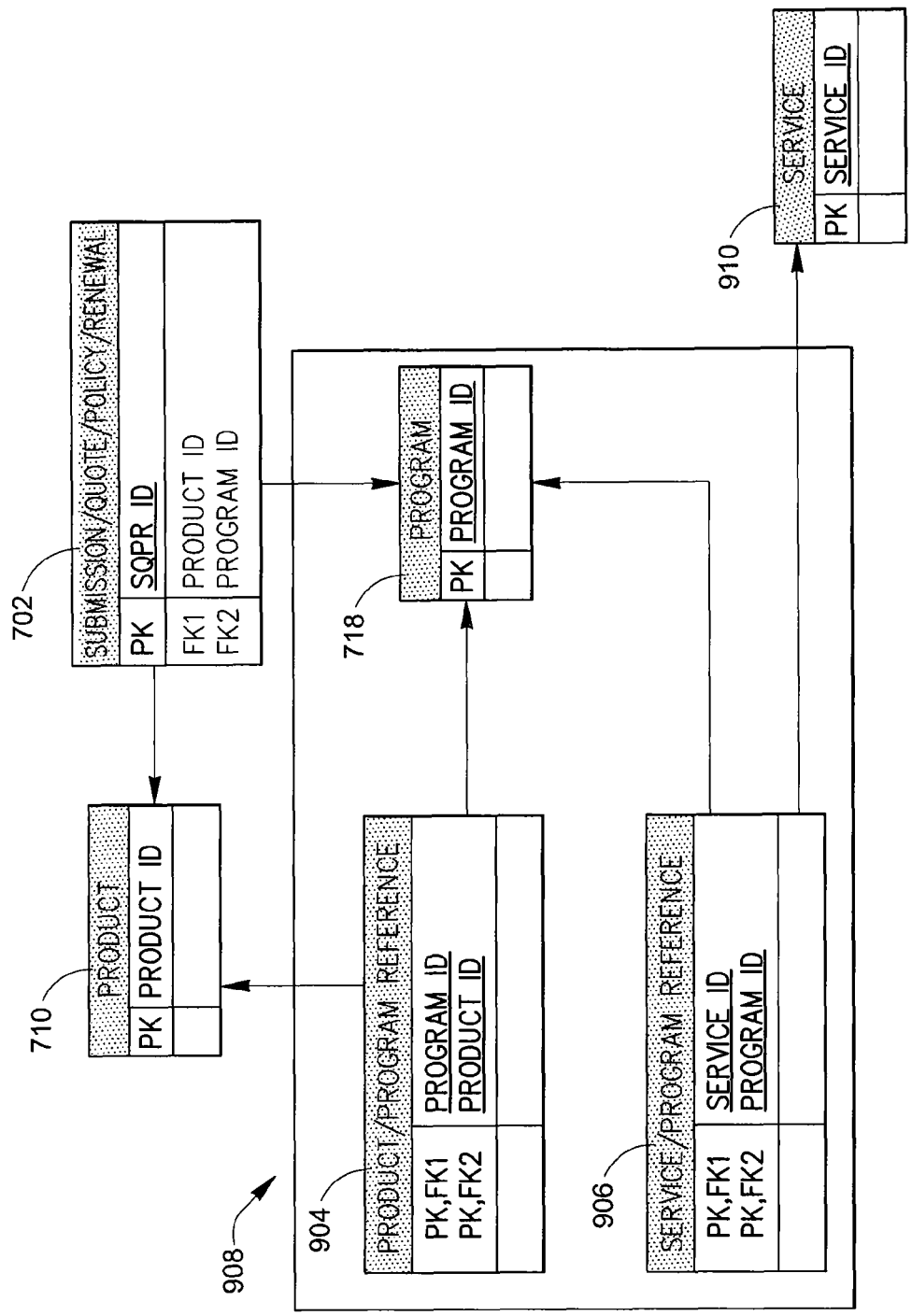
FIG. 9 is an entity-relationship diagram of a program entity class and its relationship with a product entity class and a service entity class.

An example of a program entity class for insurance-related offerings is shown in FIG. 9. However, the program entity class may be implemented with respect to any type of offering. In this figure, all the blocks represent entities. This program entity 908 is shown in terms of its relationship to entities in the product entity class and the service entity class (see reference numbers 602 and 604 in FIG. 6, respectively). More specifically, the program entity 908 is shown in terms of its relationship to the SQPR entity 702, the product entity 710 and a service entity 910. Individual instances of the program entity class 908 (each a "program data object") link together individual instances of the product entity 710 (each a "product data object") and the service entity 910 (each a "service data object") to create programs. A program may be a combination of products or services or both. The program entity class 908 may also include attributes that store information relating to a particular program, such as effective and expiration dates. The details of the services and/or products included in a program are stored as attributes in the service entity 910 and product entity 710, respectively. The service entity 910 may be included in the service entity class (see reference number 604 in FIG. 6) and may include a service ID attribute as a primary key. The service ID attribute serves as a unique identifier for each instance of the service entity 910 (a "service data object").

The program entity class 908 may include a program entity 718, a product/program reference 904 and a service/program reference 906. The program entity 718 includes a program ID attribute as a primary key, which uniquely identifies each program data object. The program entity 718 is linked to the product entity 710 and the service entity 910 by the product/program reference entity 904, and the service/program reference entity 906, respectively. The product/program reference entity 904 and the service/program reference entity 906 serve as cross-reference tables that associate a particular program with a particular product or service, respectively. The product/program reference entity 904 includes a program ID attribute and a product ID attribute as primary and foreign keys. The values used for these attributes will link the program associated with the value used for the program ID attribute with the product associated with the valued used for the product ID attribute. In a similar manner, the service/program reference entity 906 includes a program ID attribute and a service ID attribute as primary and foreign keys. The values used for these attributes will link the program associated with the value used for the program ID attribute with the service associated with the valued used for the service ID attribute.

Figure 10:
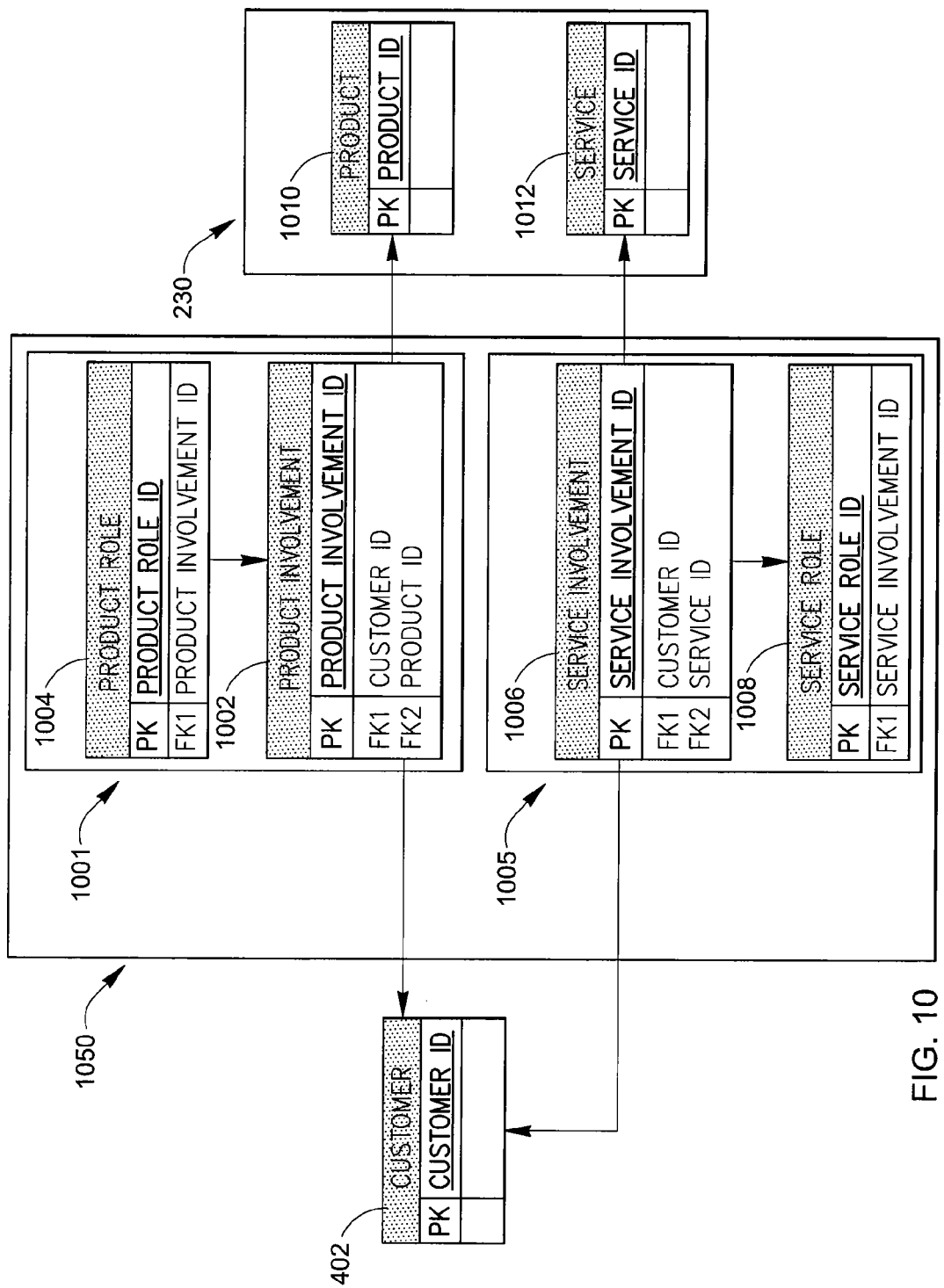
FIG. 10 is an entity-relationship diagram of an offering involvement entity class and its relationship with a customer entity class and an offering entity class.

Shown in FIG. 2, the offering involvement entity class 250 may be similar to the account involvement entity class shown in FIG. 5, in that a single offering involvement class may establish a relationship among customer data objects and offering data objects. However, when an offering entity class, such as the one shown in FIG. 6 is included in the account data structure, the offering involvement entity class 250 may include a more complex structure. An example of such an offering involvement entity class is shown in FIG. 10, along with its relationship to the offering entity class 230 (shown in more detail in FIG. 6). In FIG. 10, blocks 1001, 1005 and 230 each represent an entity class, while the remaining blocks each represent an entity. In the example shown in FIG. 10, the offering involvement entity class 1050 includes a product involvement entity class 1001 and a service involvement entity class 1005. The product involvement entity class 1001 may include entities that store product involvements. These product involvements establish relationships among customer data objects and product data objects. Similarly, the service involvement entity class 1005 may include entities that store service involvements. These service involvements establish relationships among customer data objects and service data objects.

The product involvement entity class 1001 generally includes: a product involvement entity 1002 and a product role entity 1004. The product involvement entity 1002 may include a product involvement ID attribute as a primary key, a customer ID attribute, and one or more product ID attributes (only one is shown) as foreign keys. Thus the product involvement entity 1002 is linked to the customer entity 402 and a product entity 1010. When a specific customer ID and one or more specific product IDs are indicated in the product involvement entity 1002, a product involvement is created that establishes a relationship between the customer data object with the indicated customer ID and the product data object with the indicated product ID. A customer data object may be indicated in more than one involvement, where each involvement links the customer data object to a different product data object. Similarly, a product data object may be indicated in more than one involvement, where each involvement links the product data object to a different customer data object. The product role entity 1004 may store product role data objects for customer data objects with regard to one or more product data objects, generally if a product involvement has been established. Product roles (such as insured, producer, and reinsurer) may be established for customer data objects with regard to one or more product data objects when a product involvement is created. The product role entity 1004 may include a product role ID attribute as a primary key and a product involvement ID attribute as a foreign key.

Similarly, the service involvement entity class 1005 generally includes: a service involvement entity 1006 and a service role entity 1008. The service involvement entity 1006 may include a service involvement ID attribute as a primary key, and a customer ID attribute, and one or more service ID attributes (only one is shown) as foreign keys. Thus, the service involvement entity 1006 is linked to the customer entity 402 and the service entity 1012. When a specific customer ID and a specific service ID are indicated in the service involvement entity 1006, a service involvement is created that establishes a relationship between the customer data object with the indicated customer ID and the service data object with the indicated service IDs. A customer data object may be indicated in more than one involvement, where each involvement links the customer data object to a different service data object. Similarly, a service data object may be indicated in more than one involvement, where each involvement links the service data object to a different customer data object. The service role entity 1008 may store service role data objects for customer data objects with regard to service data objects, generally if a service involvement is established. Service roles (such as subscriber, producer, and inspection contact) may be established for customer data objects with regard to one or more service data objects when a service involvement is created. The service role entity 1008 may include a service role ID attribute as a primary key and a service involvement ID attribute as a foreign key. In this manner, a specific role or set of roles may be associated with a particular involvement.

Figure 11:
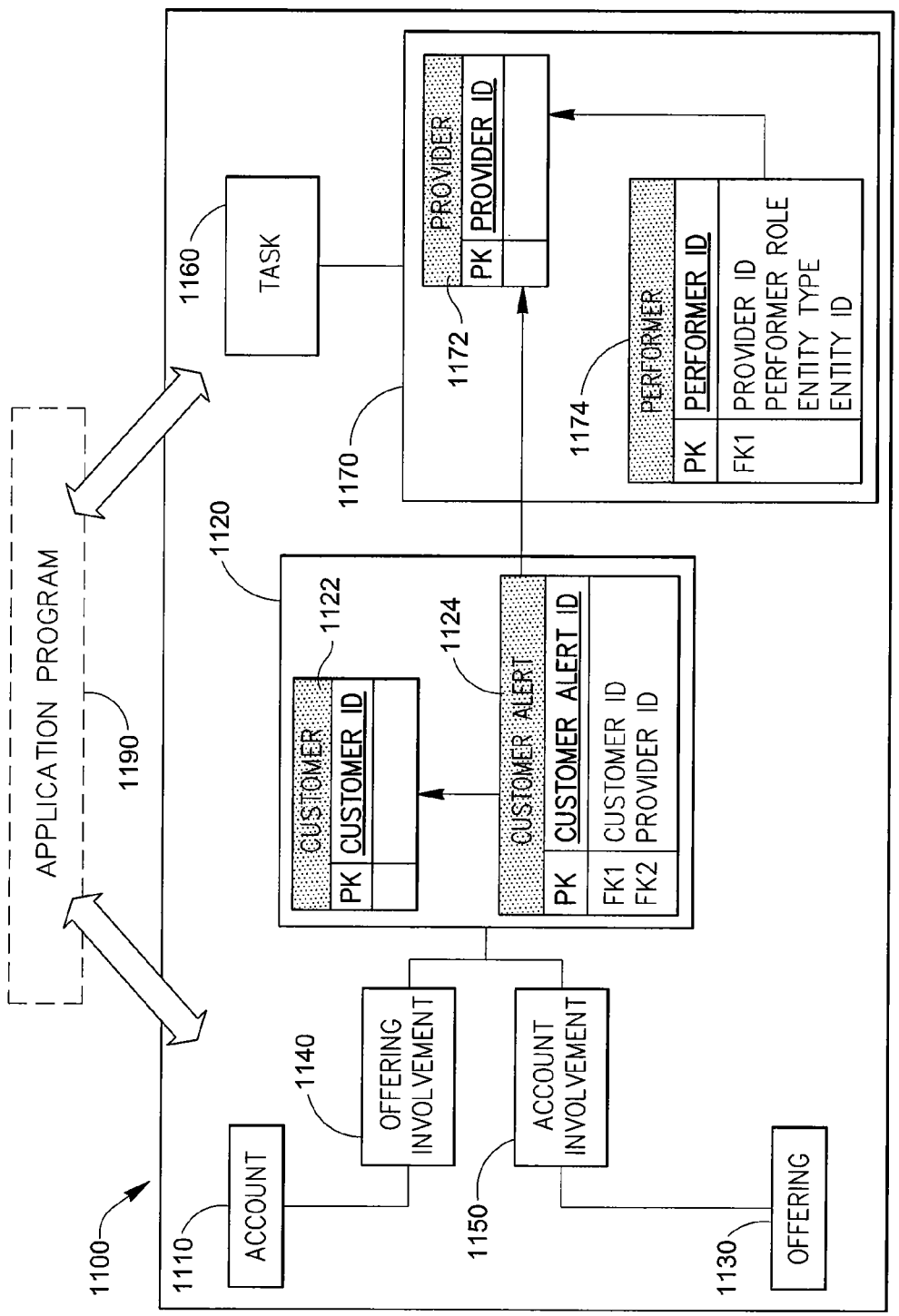
FIG. 11 is a block diagram of another account data structure and its interaction with an application program.

Another example of an account data structure is shown in FIG. 11. This account data structure 1100 is shown along with its relationship to an application program 1190. In this figure, the blocks with shading represent entities, while the blocks without shading represent entity classes. The account data structure 1100 may include an account entity class 1110, a customer entity class 1120, an offering entity class 1130, an account involvement entity class 1140, and an offering involvement entity class 1150 in a manner similar to that previously described. In addition, the account data structure 1100 may further include a task entity class 1160 and a provider entity class 1170.

The provider entity class 1170 may store information relating to the individuals and/or organizations that provide the offerings to the customer (the "providers"). The provider entity class 1170 may include one or more provider entities that each may store individual instances of provider-related information ("provider data objects"). For example, the provider entity class 1170 may include a provider entity 1172 that stores information relating to a related group of providers such as a company or organization. The provider entity may include a provider ID attribute as a primary key that uniquely identifies a particular provider (a "provider data element"). Further, the provider entity class 1170 may also include a performer entity 1174 that stores information relating to an individual provider. The performer entity 1174 may include a performer ID attribute as a primary key and may also include a performer role attribute. The performer role may include, underwriter, rater, underwriter assistant, and account owner. In addition, the performer entity may include attributes such as entity type and entity ID, which will be discussed in more detail subsequently. Further, the performer entity 1174 may be related to the provider entity 1170 by including the provider ID as a foreign key. In this manner, individual instances of the performer entity 1174 ("performer data objects") may be related to provider data objects. This enables, for example, one or more particular performers to be associated with a particular company or organization.

The task entity class 1160 may store information relating to specific actions or tasks relating to the provision or servicing of offerings for which offering data objects are stored in the offering entity class (for example, see FIG. 6-9). The task entity class 1160 may include one or more task-related entities that each may store individual instances of task-related information ("task data objects"). For example, the task entity class 1160 may include an event entity class (not shown) that may store information regarding events that are related to offerings and that trigger one or more tasks ("offering-related events"). For example, in the context of insurance, receipt of new business for an automotive policy may be an event that triggers tasks such as, ordering a motor vehicle (or MVR) report. These events may be reflected as changes in some of the data objects. For example, (again in the context of insurance) the receipt of data from external providers (such as an insurance-to-value report on a commercial property policy) may be received automatically and result in updates to some of the fields in the covered item entity class (which is part of the offering entity class 1130). In another example, the task entity class 1160 may also include a task entity (not shown) that stores task data objects relating to an individual task associated with a particular event (such as, ordering an MVR in response to receipt of new business, as in a prior insurance example).

As in previous examples, the customer entity class 1120 may include one or more entities that store different aspects of customer-related information. For example, the customer entity class 1120 may include the entities and relationships described in connection with FIG. 4. As shown in FIG. 5, the customer entity class 1120 may include a customer entity 1122 and a customer alert entity 1124. The customer entity 1120 may include a customer ID attribute as its primary key, and may also include other attributes such as those previously described. The customer alert entity 1124 may store information relating to a customer that is not captured by the other entities in the customer entity class 1120. For example, the customer alert entity 1124 may include attributes that indicate that a customer only wishes to be contacted via email. Other alerts may include "do not call at work," or "has a prior history of insurance fraud." The customer alert entity 1124 may include a customer alert ID as its primary key that uniquely identifies a particular instance of a customer alert (a "customer alert data object"). The customer alert entity 1124 may also include the customer ID of the customer entity 1122 as a foreign key. In this manner, a customer data object may be linked with a customer alert data object.

The provider entity class 1170 may be linked to the customer entity class 1120. A relationship between the provider entity class 1170 and the customer entity class 1120 may be established by providing a link between the provider entity 1172 and the customer alert entity 1124. The customer alert entity 1124 may include the provider ID attribute of the provider entity 1172 as a foreign key. In a particular instance, generally, the provider ID of the particular provider (indicated by the appropriate provider data object) that supplied, entered, suggested or is in some way connected to the particular customer alert (indicated by the appropriate customer alert data object).

In addition to, or instead of the other links shown in FIG. 11, the provider entity class 1170 may be linked to the account, customer, or offering entity classes, 1110, 1120, and 1130, respectively. As previously mentioned, the provider entity class 1170 may include a performer entity 1174 that may include an entity type attribute and an entity ID attribute. These attributes enable a relationship to be formed between the provider entity class 1170 and an entity in the offering, account, or customer entity classes (see FIG. 2, reference numbers 230, 210, and 220, respectively). The entity type attribute may contain information that identifies the entity class to which the provider entity class 1170 has a relationship. The entity ID attribute identifies the particular attribute in the entity class with which the provider entity class 1170 has a relationship. This attribute provides a link with a particular provider data object that includes the ID of the data object containing the identified attribute. In addition, if the performer entity 1174 may be linked to a particular data object in connection with a role, if the performer entity 1174 includes a performer role attribute.

In addition, links among the task entity class 1160, the provider entity class 1170 and other parts of the data structure may be made by an application program 1190. For example, the application program 1190 may be some type of event processor that monitors the data structure for the existence of or changes in certain attributes. When the event processor detects a change in these certain attributes, it will process the changed data. One example of such an event processor is described in U.S. patent application Ser. No. 09/305,331, filed on May 4, 1999, and assigned to the assignee of the present invention (the "'331 application"), the entirety of which is incorporated herein by reference. Upon detecting an attribute indicating the occurrence of an event, the event processor may verify that the account to which the event belongs (the account data object) is eligible to process tasks.

Once this verification is complete, the event processor may take the data that is available for the event and pass it along to the task engine, where the data is validated to determine if any tasks should be created. If the task engine determines that one or more tasks should be created, the task engine may determine the appropriate task or tasks for the detected event and may assign a provider to perform the task or tasks. One example of such a task engine is described in the '331 application. Upon communication of an event from the event processor, the task engine may determine the appropriate task or tasks according to templates and other information stored in the task entity class. The task engine may also determine the performer or performers to which the task or tasks are to be assigned according to the roles assigned to the performers in the performer entity. The task engine may then communicate the tasks to the task entity class 1160 for storage. Thus the task engine provides a further link among the entity classes in the account data structure.

Because the account data structure enables related customers along with their associated offerings to be linked to the same account, application programs may perform their functions at the account level. For example, an application program may search for and display all customers for which an involvement has been created to the same account. The ability to deal with customer data objects on the account level enables business rules to be applied at the account level.

Account-Based Application Programs

Figure 12:
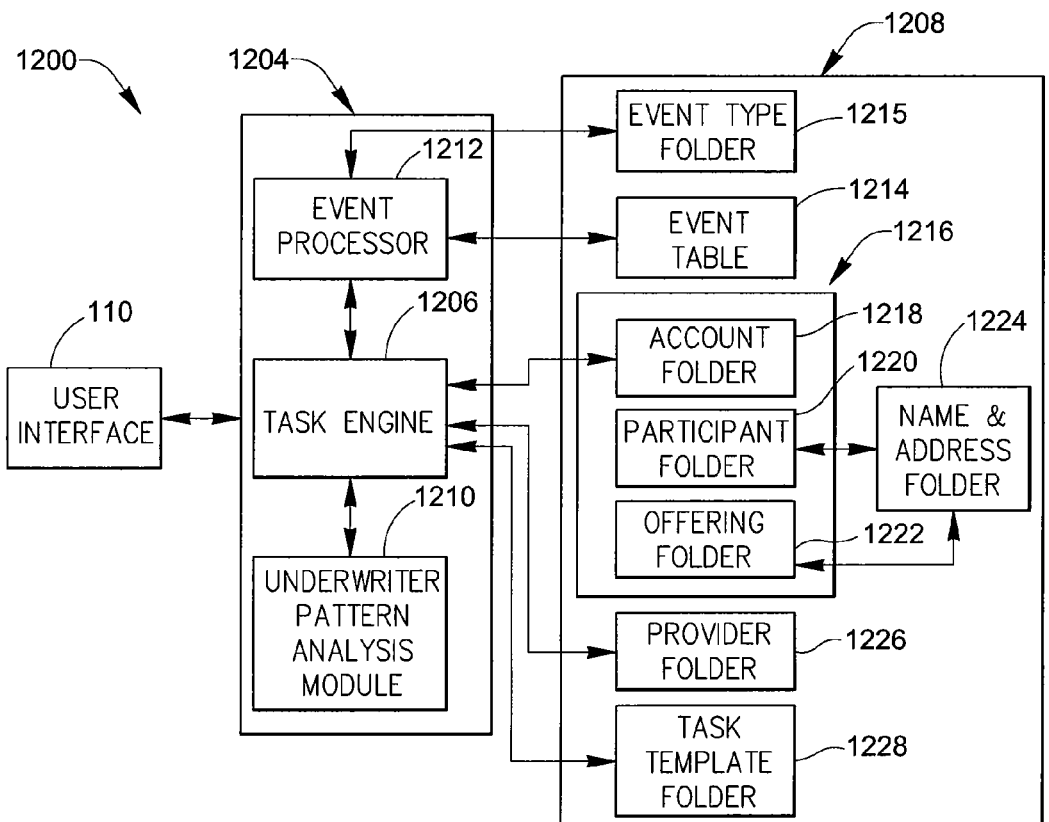
FIG. 12 is a block diagram of a system for implementing the data structure according to the present invention.

Turning now to FIG. 12, a block diagram of a system for implementing the account data structure with account-based application programs according to the present invention is shown. The user interface module 110 is coupled with a server 1203 enabling the data structure described above. Server 1203 comprises an event application block 1204 having a task engine 1206 and information block 1208. The task engine 1206 receives information from information block 1208, and communicates with an underwriter pattern analysis module 1210 or an event processor 1212. The event processor 1212 receives event information from an event table 1214 and an event type folder 1215. The task engine 1206 communicates with an account data block comprising an account folder 1218, a participant folder 1220, and an offering folder 1222. The participant folder and the offering folder are coupled to a name and address folder 1224, as previously described. The task engine also communicates with a provider folder 1226 and task template folder 1228. The various functions of the various blocks will be described in more detail in reference to the remaining figures. The various blocks and databases enable underwriting activities to be performed, as also described in detail in reference to U.S. application Ser. No. 09/305,234, filed on May 4, 1999 and assigned to the assignee of the present invention, the entirety of which is incorporated by reference.

Figure 13:
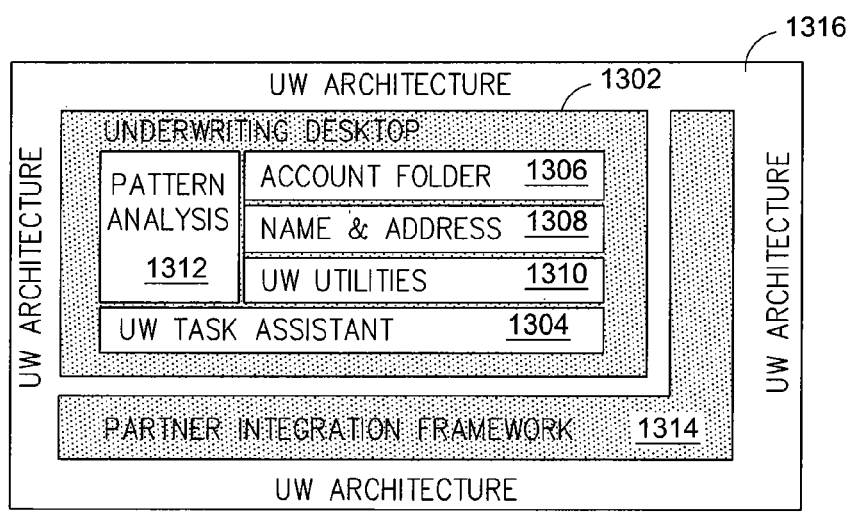
FIG. 13 is a block diagram showing underwriting component according to an embodiment of the present invention.

Turning now to FIG. 13, a functional block diagram shows an underwriting component according to an embodiment of the present invention. The underwriting desktop 1302 is a web-enabled workstation that houses the key subcomponents that support underwriting processing, and could be accessed for example by user interface module 110 and implemented on the server 1204. The underwriting desktop 1302 comprises an underwriting task assistant 1304 which captures an insurer's underwriting strategies and prompts underwriters to apply them. Underwriting task assistant 1304, implemented by the task engine, captures knowledge of the organization's best underwriters in the form of decision rules to assign tasks and account resolution following best practices with minimal delays. The underwriting task assistance facilitates efficient and effective processing of accounts, automatically prompts an underwriter to do the right tasks at the right time, automates as many tasks as possible, enables simultaneous, real-time access to task information by multiple people, enables automatic launching of application interfaces by using conventional word processing software for forms completion, enables enhanced customer satisfaction through positive interactions and minimal delays, provides customizable and scaleable-highly configurable before and after installation. Underwriters and supervisors can add own tasks, assigns to appropriate underwriter, and automatically record completed tasks.

The underwriting desktop 1302 also comprises an account folder 1306 which allows anyone in the underwriting organization to quickly access account and policy information from any location. The account folder 1306 preferably accesses discrete pieces of data about an insurance claim from the account entity class (see FIG. 3, reference number 210) in the database (see FIG. 12, reference number 160), and enables simultaneous, real-time access to pertinent data by all internal and external staff involved in the underwriting process, as well as real-time collaboration using quick navigation and centralized access. The account folder also enables easy integration into company's policy systems. Finally, the account folder provides a single view of an account with status, centralizes real-time information, speeds processing and improves customer satisfaction. All of which is accessible from the account entity class (see FIG. 3, reference number 210) in the database (see FIG. 12, reference number 160).

The underwriting desktop also comprises a name and address folder 1308 which provides a single source of contact by centralizing all contact information of all parties involved. The name & address folder 1308 may, for example, access information in the customer entity class (see FIG. 4, reference number 220). This information may relate to individuals and businesses such as all names, all addresses (home and/or business), all phone numbers (business, home, fax, cellular, etc), alerts, tax identification or social security numbers, e-mail addresses, D&B number, etc. The name and address folder 1308 may serve as the single source of all information for customers. As will be described in more detail in reference to later figures, the name and address folder 1308 also helps manage vendors, customer service commitments, and underwriting logistics. Accordingly, the name and address folder 1308 reduces time and cost associated with mail processing, telephone traffic and file maintenance.

Underwriting utilities 1310 provides a flexible search engine accessible on the underwriting desktop to enhance customer communication, accelerate account resolution, and provide underwriters with all the information and tools necessary to process an account or offering (which may include submissions, quotes, policies and/or renewals, each an ("SQPR")). Underwriting utilities helps underwriters communicate with parties involved in an account, documents actions taken and information collected, and with underwriting task assistant 1304, delivers underwriters forms and letters needed to take next appropriate action.

Underwriting pattern analysis block 1312, also available on the underwriting desktop, enables sharing and embedding underwriting organization intelligence, and automatically segments submissions, quotes, policies, and renewals according to complexity, risk and other patterns that the organization defines. Underwriting pattern analysis block 1312 also analyzes incoming and current business according to a cluster of attributes. Accordingly, an underwriter is able to focus attention to complex risks, referrals and exception handling. The underwriting pattern analysis block 1312 also enables a client to add and change account profiles stored in the database and business practices without rewriting code.

A partner integration framework 1314 provides seamless integration with external systems such as report ordering and provides internal systems that house policy processing, data warehousing, and claims. Data mapping and translating interfaces are preferably assembled outside software's code, so as not to affect core application structure and availability, although they could be implemented as a part of the software core.

Finally, an underwriting architecture 1316 provides web-based technology architecture designed to meet the scalability and flexibility requirements of underwriting organizations and support on-line transaction processing. Underwriting architecture 1316 enable to underwriting desktop to run on Microsoft Windows® DNA 200 and .Net platforms and facilitates web services to simplify data exchange and simplify modifications to core software. The underwriting architecture enables a configurable underwriting process that readily extends to other departments and functions inside the organization as well as to outside vendors. Therefore, the underwriting architecture supports easy reconfigurations and extends to other departments and functions inside and outside the organization, thin client, browser based technology and Open architecture and access to source code. Finally, the underwriting architecture allows transaction load to be scaled across multiple web and application servers through a load balanced solution, minimizes network traffic, and captures performance metrics.

Figure 14:
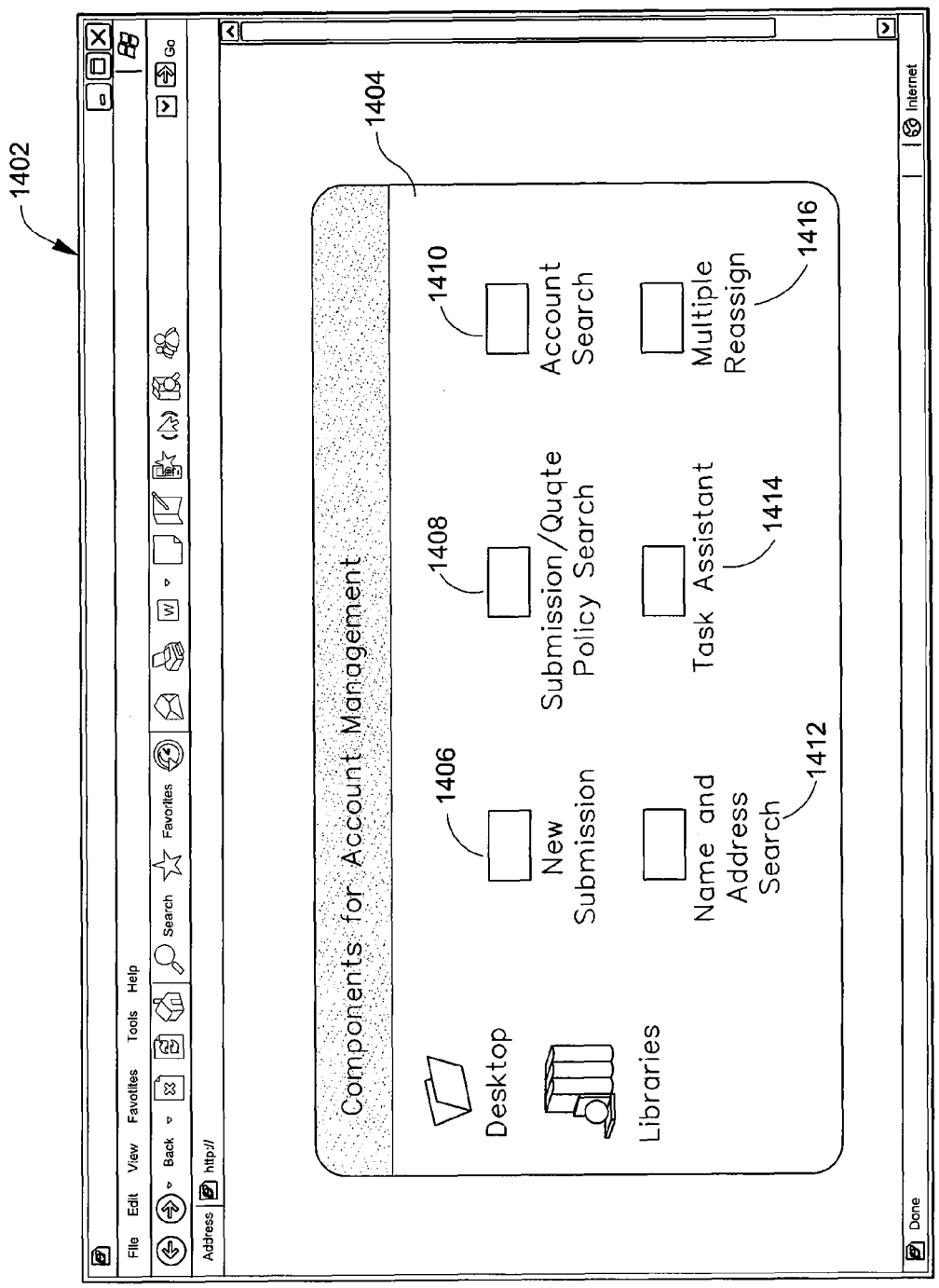
FIG. 14 is an exemplary user interface showing components for account management according to the present invention.

Turning now to FIG. 14, an exemplary user interface shows components for account management according to the present invention. In particular, a user interface 1402 displays an account management window 1404 having a plurality of user selectable icons, which will be described in more detail in reference to later figures. In particular, the components for an account management window may include a new submission icon 1406, a SQPR search icon 1408, an account search icon 1410, a name and address search icon 1412, a task assistant icon 1414, and a multiple reassign icon 1416.

Figure 15:
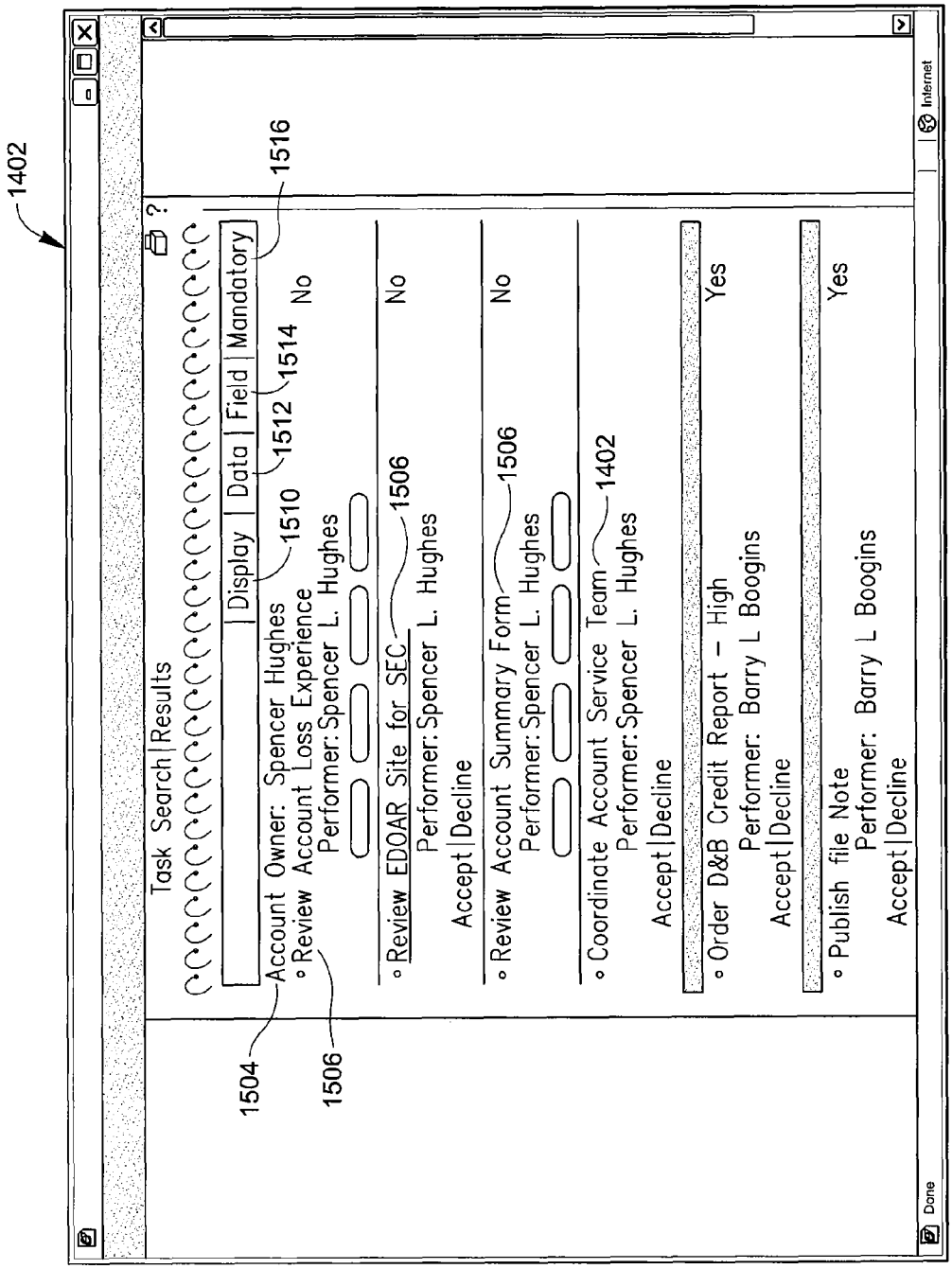
FIG. 15 is an exemplary webpage showing an underwriting task assistant according to the present invention.

Turning now to FIG. 15, an exemplary webpage shows the function of the underwriting task assistant according to the present invention. The underwriting task assistant webpage 1502 shows an account owner field 1504 that is displayed in response to a query, such as a query enabled by a account search icon 1510. The query may use the account and/or account involvement entity classes to determine which customer is associated with the specified account in order to retrieve information for the account owner field 1504 from the customer entity class. Tasks 1506 are each displayed, and have corresponding data in a display field 1510, due date field 1512, type field 1514, and mandatory field 1516.

Turning now to FIG. 16, an exemplary webpage shows an account folder according to the present invention. In particular, an account details webpage 1602 comprises an account identifier information block 1604 having a user selectable account name field 1606 from the account entity class (see FIG. 3, reference number 210). Also, an account details block 1610 comprises a user selectable standing field 1612, a type field 1614, a total written premiums field 1616, a status field 1618 and a tier field 1620, which display information from the account entity class. A key individuals field 1630 having a user selectable role field 1632 is also included. Finally, selection option 1640 enables a user to view child accounts, which are defined by the account group entity in the account entity class (see FIG. 3, reference number 304.

Figure 17:
FIG. 17 is an exemplary webpage showing a name and address page according to the present invention.

Turning now to FIG. 17, an exemplary webpage showing a name and address page according to the present invention is shown. In particular, a web page 1702 comprises a business entity identifier field 1704, a business entity information field 1706, an industry classification field 1708, a credit rating field 1710, and a key individuals field 1712 accessed from the customer entity group (see FIG. 4, reference number 220). There are many benefits to this corporate Name & Address book view. For example, the view more accurately maps customers such as insureds to offerings such as policies to accounts for better identification of trends (i.e. risk exposures), enabling more granular risk patterns for underwriting and therefore greater precision in risk assessment and pricing. It also minimizes duplicate quotes and policies (e.g. inadvertently stacking limits through two policies for the same insured) and provides better billing and collection reconciliation. The corporate name and address book also enables linking individuals and businesses via the customer involvement entity class (see FIG. 4, reference number 419) to cross/up-sell between (and within) personal and commercial lines (e.g. targeting an individual for his personal auto/home policies as well as his small business policies).

Customers listed in the Name & Address book are linked to accounts using a "participant." A participant is the relationship between a customer and an account. Therefore, a customer that is associated with an account may also be referred to as a participant, as previously defined. In the database, a participant is created by associating a customer data object with an account data object in the account involvement entity (see FIG. 5, reference number 502), and defining a role for the customer with regard to the relationship (see FIG. 5, reference number 504). It is possible for a customer to have multiple roles in a single relationship or across many relationships. Roles may include insured, driver, contact, agent, etc. Linking customers with accounts to define participants enables customers in the Name & Address book to be viewed and treated separately from the participants.

A benefit of the separation of the Name & Address book, which may be stored in the customer entity class, from the participant relationship, which may be stored in the account involvement entity class, is that it enables the Name & Address entries (such as customer data objects relating to businesses and individuals) to be used across corporate systems. An insurer has the ability to capture more detailed information about the customer in the Name & Address book, which can be applied to a wide variety of corporate applications. Thus, this flexibility allows the Name & Address book to function as an entire corporate address book.

Figures 18, 19:
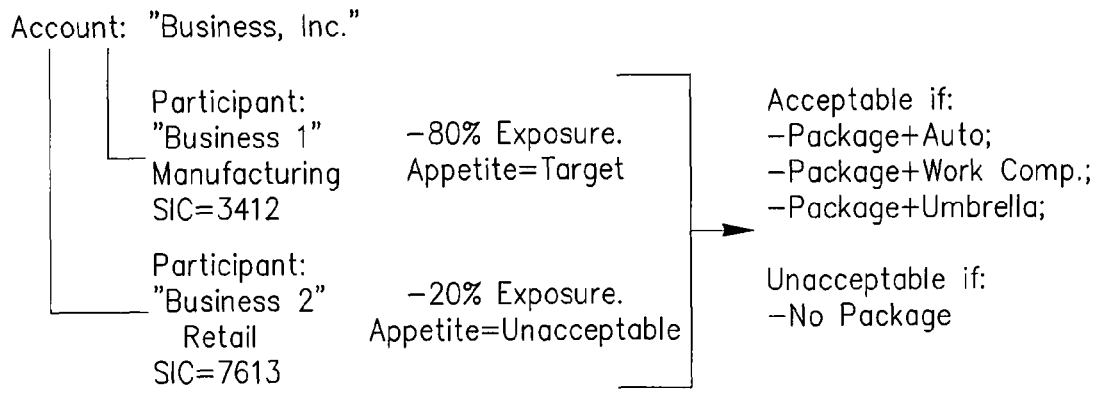
FIG. 18 is a tree diagram showing the implementation of the data structure enabling an insurer write business rules according to the present invention.
FIG. 19 is a tree diagram showing the three tiered structure of an account according to the present invention.

Turning now to FIG. 18, a tree diagram shows the implementation of the account data structure that enables an insurer to write business rules. As described above, the account-based system of the present invention enables an account to exist separately. Current underwriting systems comprise a two-tier structure, which limits an insurer's ability to view and/or manage an account. In the current system, an account can only be recognized according to individual customers to whom policies are sold. This view does not give the insurer the flexibility to combine customers together into an account to fulfill a business and/or marketing need against which metrics can be reported and rules can be applied. According to the account data structure of the present invention, the storage of account, customer and offering/product data into separate entity classes enables a three-tiered structure that addresses the business void of the two-tiered structure.

In particular, a three-tiered structure according to the present invention gives insurers the ability to combine one or more customers and their offerings (such as policies) with accounts as participants. The participants may be viewed according to their associated accounts. The insurer now has the ability to create business rules and processes to manage and make decisions at the account level, and the flexibility to define participants in many different capacities.

The first tier of the three-tiered structure is the account. An account could be a customized collection of participants, which may be independent of the policies, services and other data that may be captured about the participants. Specifically, for purposes of underwriting/account management, an account could be the collection of participants, offerings (which may include SQPR's, and/or service subscriptions), and/or providers (which may include producers, and team members). Accordingly, an account in the present system differs from those of conventional systems in which an account is merely the aggregation of customers in the context of policies sold. In such conventional or legacy systems, there is no conception of a participant, which links customers to accounts. Conventional systems merely support customers in the context of policies sold.

The second tier is the participant. As previously discussed, the participant provides information regarding the customers, which are associated with accounts. This information includes the customer's role in connection with their relationship to an account. This second tier enables information to be viewed and manipulated from the same point of view allowed by conventional systems.

The third tier includes the offering. The offering is the products and/or services offered or provided to a customer by an insurer. The offering may include submissions, quotes, policies and/or renewals. Describing offerings (such as policies and services) in terms of SQPR enables the management of the entire offering lifecycle. A submission, quote, policy, and renewal may represent the same offering, but at a different stage of the offering's lifecycle. A solicitation for an insurance policy from a customer or agent is an example of a submission. Once an insurance carrier has processed the submission, it will respond with a "quote" to the customer that the customer will then either accept or reject. An accepted quote will become a policy. The information related to the SQPR is stored in the product entity class of the data structure (see FIG. 7, reference number 701), which may also store data such as loss ratio, premium information, coverages, buildings and locations, and other data that may be required to manage the offering throughout its lifecycle.

As a result of the innovative account data structure of the present invention, the insurer will now be able to write business rules at all three levels of the three-tiered structure. Various tools, such as the task engine and pattern analysis described in connection with FIGS. 12 and 13, can now be used at each level to assist the insurer in defining and executing business rules and decisions.

The business and decision making abilities of a conventional system and the account-based system will now be described. For example, consider a parent company called "Business Inc.," which is made up of two distinct business entities that may involve entirely different types of business, but are both subsidiaries of "Business, Inc." For example, "Business 1" specializes in manufacturing while "Business 2" specializes in retail. Business, Inc., Business 1, and Business 2 are all separately stored as customers in a conventional underwriting system. Suppose an agent submits an application for "Business Inc." for two policies, each under the name of one or its two subsidiaries to the conventional system. Based upon the Standard Industry Code (SIC) of Business 1 and Business 2, which may be found in the separate files for each business, the insurer will be able to assess the nature of the business and quote policies separately for Business 1 and Business 2. The risk exposure of the two policies may be 80% and 20% for manufacturing and retail, respectively. The insurer that receives the submission may have a specified "target" appetite risk that makes the manufacturing business desirable, but which considers retail business undesirable. Because the insurer has specified a favorable appetite for manufacturing, the task engine/pattern analysis will accept the risk for "Business 1." Conversely, because the insurer's risk appetite for retail deems this business "unacceptable," the task engine/pattern analysis will reject the risk for "Business 2." Therefore, using a conventional two tier system, there would be no opportunity to view these two risks in the context of the business needs for the parent company. The parent company (Business Inc.) may then choose to reject the insurer's quote for "Business 1" because the insurance carrier did not accept the risk associated with "Business 2."

However, the three-tiered structure of the account-based system, which is enabled by the account data structure of the present invention, allows the insurer to recognize that Business 1 and Business 2 are actually part of the same parent company because Business 1 and Business 2 are associated with the same account (which may be labeled "Business, Inc."). This enables decisions to be made based on the account, rather than on the individual customers. The three-tiered structure will allow the insurer to determine that the overall risk for the account (Business Inc.) is acceptable. Therefore, the insurer will now accept both risks and turn around a quote for both Business 1 and Business 2. As such, the insurer will be better positioned to earn the business of the parent company (Business Inc.).

With the three-tiered structure, an insurer also has the ability to write rules about the mix of SQPRs for each customer in relation to the account. Continuing with the previous example, the insurer defined an acceptable risk arrangement for the Business Inc. account, despite the unacceptable retail business exposure posed by a portion of the account, and in consideration of their appetite for the SQPRs to be quoted. As a result, the rules from the task engine or pattern analysis will dictate that the insurer is willing to accept both risks as a package for this account.

Turning now to FIG. 19, a tree diagram shows the three tiered structure of a personal line account according to the present invention. In a household of 4 individuals, 3 of the members are good drivers, while 1 is considered to be a very bad driver. For the household as an account, we have 3 types of polices with the following premium amounts: $8000 in auto premiums, $10000 in home owner's premiums, and $2000 in personal excess premiums. When the task engine or pattern analysis tools evaluate the auto policy for the bad driver in a conventional two-tier structure, the system or underwriter would recommend denying the renewal on the policy.

However, in evaluating the account based upon a three-tiered structure according to the present invention, the task engine/pattern analysis or the underwriter evaluates the "Bad Driver" policy in the context of the entire account, including all of the account data available. Therefore, the outcome will be much different. The insurer will not want to lose the other customers (which, in this case are policyholders), which they are at risk of losing because they are part of the same household. Therefore, the insurer will structure a quote so that the risk for the entire account is manageable and the account is not lost. In this case, the renewal for the automobile policy for the Bad Driver will most likely be accepted.

Turning now to FIG. 20, a tree diagram shows a decision process based upon an account having a three tiered structure according to the present invention. According to the example of FIG. 20, the Bad Driver gets married, and purchases a new house. In doing so, the Bad Driver is no longer part of the household account, but forms a new "household 2" account that includes only the Bad Driver. The insurance carrier now will evaluate the auto policy in a much different manner. Given the loss history of the "Bad Driver" from his previous account (available via an Account History feature of the system of FIG. 12), the insurer may determine that it does not want to write a mono-line auto policy for Bad Driver. Therefore, the insurer would not accept the risk for Bad Driver's mono-line auto policy.

However, the insurer has a dominant appetite rule that says it prefers to write homeowners policies. The insurer has set up its appetite rules so that the existence of a homeowners policy is a weighted factor in determining the outcome. As such, the insurer might come to a completely different conclusion if there had been a homeowners policy as part of the mix. The task engine/pattern analysis would then process the account and make a recommendation to accept the auto policy as well as the homeowners policy for Bad Driver.

In FIG. 20 the three tiered structure also enables an insurer to create new business processes and better manage the existing ones. For example, two distinct, yet inter-twined, processes in underwriting, team assignment and task assignment, can demonstrate how the data structure of the present invention allows for better business processes.

Turning now to FIG. 21, a tree diagram shows an example of how the three tier structure enables performers to be assigned to any of the three tiers of an account, at which point they become "team members" (the "assignment process") The team members may then be assigned to tasks generated in connection with the account (the "task assignment process"). The three-tiered structure enables the insurer to assign specific team members to any of the three tiers based upon their team member profiles (i.e. skill set, level, geography territory, producers handled). The account data structure enables such information to be stored in the provider entity class (see FIG. 11, reference number 1170. From this information, performer data objects may be associated with account, customer, and/or offering data objects using the entity type and entity ID attributes, as previously described. As a result, the performers are associated with one or more tiers of an account to become team members, although each performer instance is typically associated with one tier level. In this manner, the assignment process gives the insurer the opportunity to best allocate resources for maximum efficiency and effectiveness, and allows for great flexibility in assignment. For example, FIG. 21 shows how performers may be assigned as team members to the different tiers of and tasks associated with an account. In this example, the ABC account includes the following participants: A Co., B Co., and C Co. Each participant is associated with an offering, Policy 1, Policy 2 and Policy 3, respectively. The performers include: John Smith, Jane Jones, Joe Joseph, Bob Roberts, Jake Jacobs, Clarke Clarkeson, Tom Thompson, and Jack Jackson, all of which have one or more roles associated with them, which may be indicated in the performer entity by a performer role attribute (see FIG. 11, reference number 1174). It should be noted that a performer will typically only have one role at a time. The performers are all assigned as team members to the ABC account. In addition, the team members are assigned to different tiers. For example, John Smith is assigned as a Regional Underwriter for the ABC account, while Jane Jones, Bob Roberts, and Tom Thompson are assigned as the Underwriters for the participants (A Co., B Co, and C Co., respectively). Jake Jacobs is assigned as the rater for the offerings (polices) associated with each participant. In addition, Joe Joseph, Clarke Clarkeson, and Jack Jackson, are each assigned as underwriters for Policy 1, Policy 2, and Policy 3, respectively.

Continuing with the example of FIG. 21, an example of the task assignment process involving the team members that have been assigned to the ABC Account is also shown. In this example, when the policies on the ABC account are up for renewal, a task engine can create tasks for the account that will be different for each tier of the account. Further, the insurer may require different team members to perform these tasks. The three-tiered structure enables the task engine to allocate tasks to the appropriate tier and the appropriate team member.

Information ordering is another process that is improved by the three-tiered structure, an example of which is shown in FIG. 22. FIG. 22 is a tree diagram showing a submission for a new property policy (an offering) that is received for a commercial account called "Joe's Pizza." The Joe's Pizza account already includes general liability and auto policies. To evaluate the account in view of the submission, the insurer will need to order information that will allow the insurer to evaluate the property exposures and controls. However, there are quite different information needs for the evaluation of each tier of the account. Using the task engine or pattern analysis, different information will be ordered for each of the three tiers. The three-tiered structure allows the insurer to recognize the distinct information needs for the account, participant and offering in a way not enabled by the two-tiered structure. Because better information leads to better underwriting decisions, the three-tiered structure of the present invention is a great improvement over existing underwriting systems.

Figure 23:
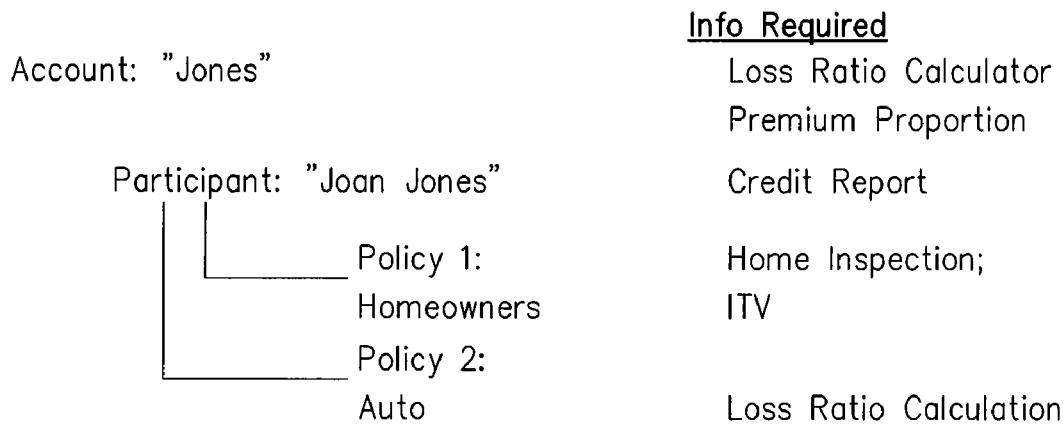
FIG. 23 is a tree diagram showing an example of different types of information required for a three tiered structure according to the present invention.

Another example of the way in which information ordering may be improved by the tree tiered system is illustrated by FIG. 23. In FIG. 23, a tree diagram shows an example of the different types of information required for each of the three tiers in a personal lines account according to the present invention. In this example, the "Jones" account includes one participant "Joan Jones," with whom the following offerings are associated: a homeowners policy and an auto policy. The homeowner policy is up for renewal, however the auto policy is not set to renew for another 90 days. Because the information required for the three tiers in the personal lines of insurance is very distinct, the three-tiered structure enables the task engine to recommend very different types of information that is tailored for each tier of the account. Once again, the three-tiered structure allows the insurer to execute better information ordering tasks, which leads to better underwriting decisions and more efficient use of resources.

Another advantage of the three-tiered structure enabled by the account data structure is that it makes it very easy to move participants and all of their associated offering information from one account to another. Participants may be seamlessly transitioned from one account to another because all of the data associated with the participants, such as premiums and loss information will be automatically carried over. In addition, data such as account totals may be automatically adjusted. An example of this advantage is shown in FIGS. 24 and 25.

Figure 24:
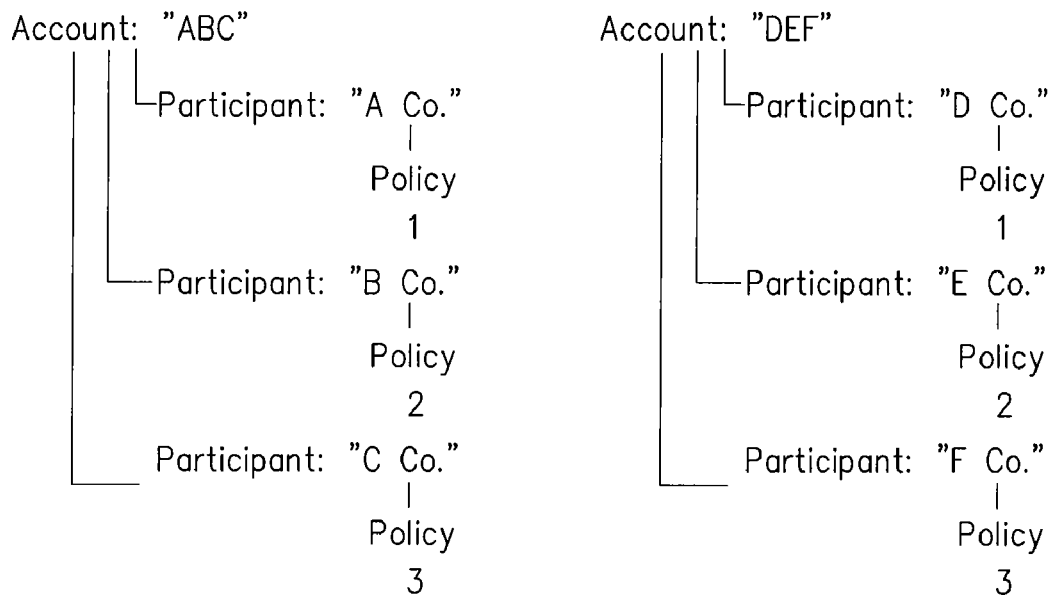
FIG. 24 is a tree diagram showing an exemplary arrangement of two parent companies according to the present invention.
Figure 25:
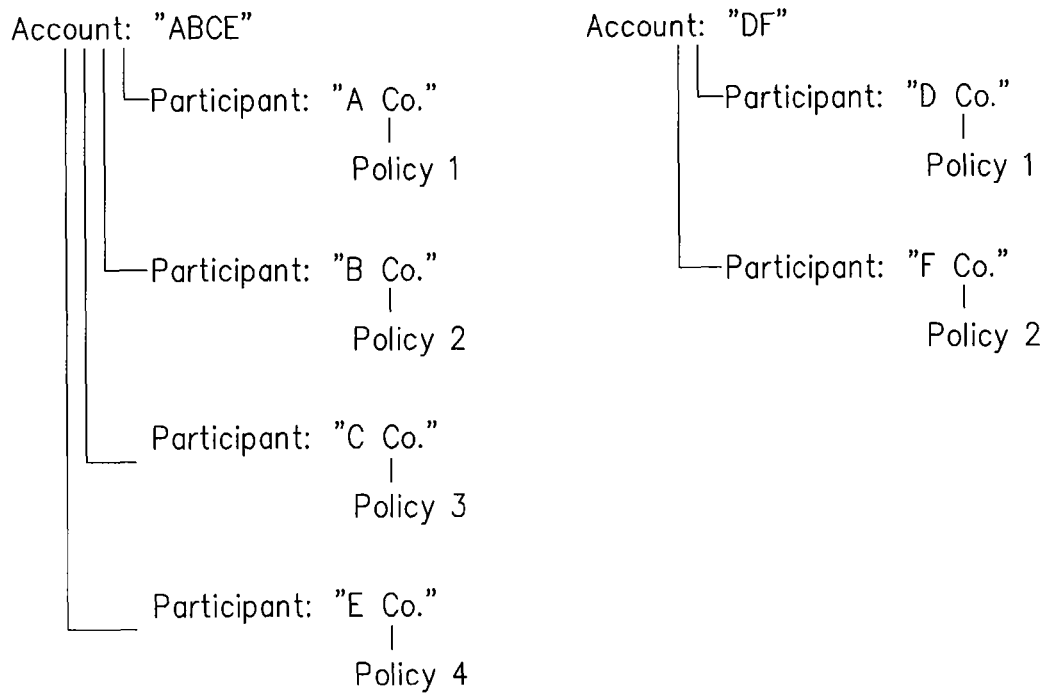
FIG. 25 is a tree diagram showing the transfer of data from one account of the exemplary arrangement of FIG. 24 to another account according to the present invention.

FIGS. 24 and 25 include tree diagrams that show an exemplary arrangement of two parent companies according to the present invention. In this example, there are two parent companies, ABC, Co. and DEF, Co. that each has 3 subsidiaries as shown in FIG. 24. In an account-based system, the ABC, Co. is associated with the ABC account and the DEF, Co. is associated with the DEF account. The ABC and DEF accounts each include the subsidiaries of the ABC, Co., and DEF, Co. as participants, respectively. In addition, associated with each participant is an offering (a policy). If DEF, Co. sells its stake in its subsidiary "E Co." to ABC, Co., and policies must now be issued for E Co., the insurer will need to move E Co. and all polices associated with E Co. to the ABC account. In other words, E Co. must cease to be a participant in the DEF account and become a participant in the ABC account. Because this involves a simple, update to the account involvement entity in the data structure, the transition is very simple and the accounts will end up as shown in FIG. 25. In addition, the ABC account may be renamed as the "ABCE" account at the time of this transfer. Because two-tiered systems do not enable transactions on the account tier of the account, insurers have not traditionally had such flexibility and ease in changing the make-up of their accounts. Enabling such transitions prevents eroding the integrity of customer and offering and historical performance data.

The first (account) tier of Account provides another function according to the present invention that was not previously available to an insurer. This new function includes the ability to group accounts together to capture the recursive relationships derived from complex business structures, such as joint ventures, in which there are shared offerings. This grouping functionality enables the insurer to create accounts that reflect the complex business structures of some customers. For example, if a joint venture exists between two companies (called Yellow and Blue), an account called Green, which is made up Yellow and Blue, can be created. However, the insurer may already have separate accounts set up for Yellow and for Blue. As a result, the insurer will want to be able to create one master account (an account group), Green, which will be a grouping of the two already-existing Yellow and Blue accounts. This is done using the account entity and the account group entities in the account entity class (see FIG. 3, reference numbers 302, 304 and 210, respectively), as previously described. Because this joint venture relationship is captured under an account group, the members of the joint venture now may hold a common policy. The ability to organize the members of a joint venture under a single account, under which the members may have common policies that are separate from their respective individual policies, is a unique feature of the accounts in of the present invention.

The data structure also allows an insurer to track all account activity through an account history. Such an account history has been previously unavailable in underwriting applications. An account history generally provides a granular view of all activity across an account and may include a history of all rules and processes that an insurer has applied to the account (via outcomes and execution). Included in the history may be information relating to tasks, such as when the task was initiated or completed and who the performer was on the task. The history may also include all transactions and system events that haven taken place in connection with the account (i.e. renewals, submissions received, rejected quotes etc). File documentation, letters and reports may also be stored as a part of this history.

The ability to combine products and services together to create programs that are tailored to an account is another unique feature enabled by the three-tiered structure. An example of this is a carrier that has a tailored offering for museums that is sold on a mass marketing basis. Additionally, the carrier could establish a special arrangement (program) to sell this offering to members of a museum association. The carrier will want to be able to understand profitability at all levels: the offering, the association-sponsored program and individual accounts. Additionally, the carrier will need to be able to pay a program dividend annually to those accounts that participated in this program and have applicable policies.

Current underwriting systems are not able to handle programs and insurers are forced to manage them with an entirely manual process. With the data structure of the present invention, insurers can now manage their existing programs, create new ones, create business rules and processes around their programs, and perform reporting/auditing via the application. An additional benefit to the data structure is that it allows insurers to manage producers (agents) on a program. Previously, these benefits were either unattainable or were attainable only through difficult manual processes.

As a result of these benefits from the data structure and the ability to move the program management into an application, insurers are able to have better precision around their data and consequently better insight around program performance. They are now able to align producers to a program and manage those relationships in that context, a key ingredient for successful results with program business. These capabilities position an insurer to pursue new profitable sources of revenue with program business.

Figure 26:
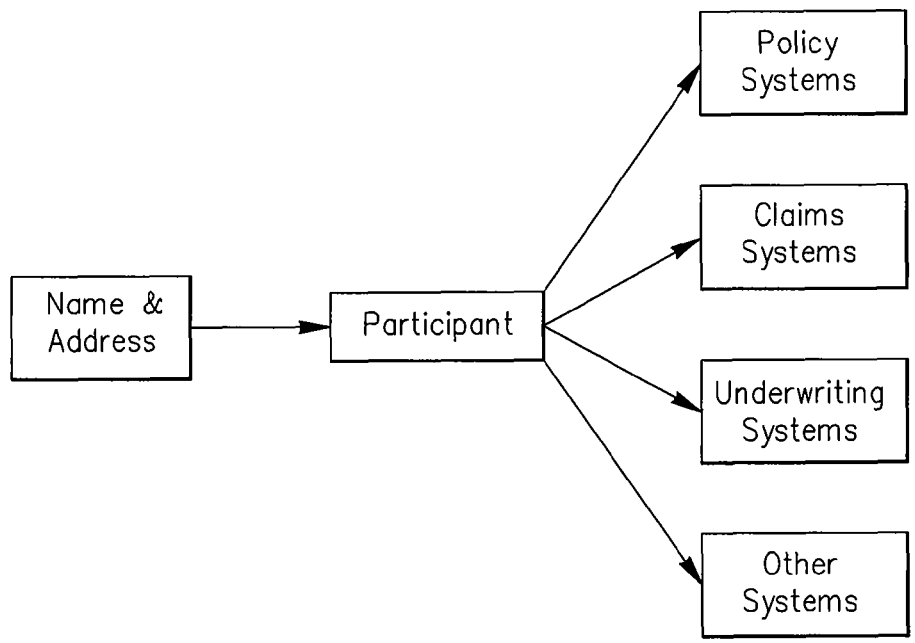
FIG. 26 is a block diagram showing the separation of the name and address data from the participant data according to the present invention.

Turning now to FIG. 26, a block diagram shows the separation of the name and address data from the participant data according to the present invention. For holistic account management, it is important to be able to distinguish between the legal entities (businesses and individuals) and how an underwriter chooses to view/manage them in the context of accounts and the products and services sold. In order to accomplish this, the data structure of the present invention has a separate name & address book and participant structure.

As a result of this structure, the name & address records reside separately from that of the policies they are a part of in underwriting/policy systems. This structure helps underwriters better align their underwriting business rules and market approach by allowing them to create an underwriting appetite that is tailored to a particular account. For example, an underwriter can consider the exposures and controls for each one of the participants in his analysis, without regard to the policies sold. However, the underwriter may have an entirely different view of those same participants in regards when viewed as a collection of individual participants on an account. The designation of participants allows the application to maintain the integrity/purity of the name & address information without polluting it with information/data required for a policy or account. This is important for an underwriting carrier's clearance/registration process and its catastrophe/accumulation management.

Unlike conventional systems which store each as a separate item on distinct tables, the data structure of the present invention allows for maximum efficiency and greater performance. The efficiency and performance are gained through a seamless data transformation throughout the lifecycle of a policy as all of the information is stored on the same table, while not compromising on the ability to distinguish the underwriting appetite rules or processes as specific to a SQPR and so on.

Another benefit to this unique data structure of the present invention is that it provides an entire audit trail and history of interaction with a participant that can be leveraged for prospecting and lead generation. This data structure allows an insurance carrier to go from prospecting, all the way to the final underwriting decision and policy issuance. The data structure of the present invention allows it to serve as the connection between the two as it maintains the lifecycle history of SQPR in one location. This structure also gives an insurer the ability to target a particular customer for a specific policy that may have been rejected. For example, the customer may have rejected a Policy when it was up for renewal. The insurer may prefer to still write this business because there is a familiarity and history with the insured. The storing of the SQPR history allows the carrier to prospect for the business again.

Figures 27, 28:
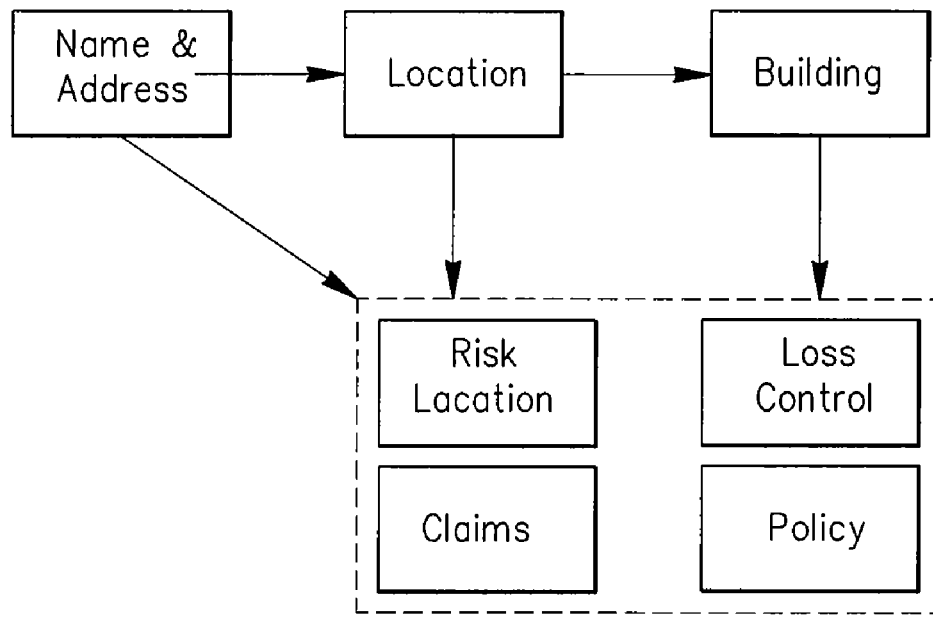
FIG. 27 is a block diagram showing the partitioning of the location and building information according to the present invention.
FIG. 28 is a tree diagram showing an unbundled service account according to the present invention.

Turning now to FIG. 27, a block diagram shows the partitioning of the location and building information according to the present invention. While some policy administration systems have considered the problem around locations and buildings, insurers are often misled by the current location/building data structures available in today's underwriting systems. Conventional data structures only capture information specific to a location, not to a building in underwriting systems. The data structure of the present invention allows the buildings and locations to be stored separately. That is, the data structure is established so that information about a location and a building are not mixed, and vice-versa. This enables insurers to have location-specific rules around details such as earthquake zone or flood zones that are distinct from the building rules around data such as fire-resistive construction or sprinkler protection.

The separation of building and location information is paramount today. Underwriters are often required to clear submissions for limits and exposures at a four-walled structure level. This allows them to minimize the possibility of duplication of limits, manage their surplus more carefully, and conform to reinsurance requirements. For example, an underwriter may decline a risk due to substantial exposure in buildings considered high risk for terrorism, for example, or may reject or re-price a risk requesting limits that impact exposure to accumulation in a single structure such that facultative reinsurance will be required. Without the separation of buildings from location, underwriters would not be able to get down to a four-walled structure analysis.

A University campus provides another example of the importance of the separation of location from building. In this example, an underwriter will need to write risk for the entire geographic area of the campus where the risk factors are earthquake zone, flood zone, wind/hail zone, access to water, fire departments, etc. Separate from the geographic area, the underwriter will also need to assess exposures for the buildings where the risk factors are construction, private protection, operations, immediate surroundings, etc. As such, it is imperative for effective underwriting to be able to separate locations and buildings.

Information ordering is another example of the need for buildings to be separate from locations. In the example of a University campus, the underwriter may only need to order a loss control inspection for fifteen of the forty total buildings at the campus. Using the data available for each of the forty buildings at the campus location, the task engine can evaluate the need for loss control inspections and create a task for the underwriter for each of the fifteen buildings that require the inspection. Without the separation of buildings from location, there would be no means of ordering the inspection for individual buildings.

The system of the present invention is also able to support many of the other scenarios that current underwriting systems are unable to support. For instance, one building may have three addresses if a building has three separate entrances on three different streets where each entrance has its own address. In this example, current systems would treat this as three separate locations that may lead to the underwriter writing duplicate policies. In the system of the present invention, however, it is possible to recognize that this is one building because it will be stored as one building tied to one location that has three different addresses.

The structure of the location and building section of the data structure is also flexible enough that it can be used by other applications outside of underwriting such as claims, loss control, premium audit and policy. Just as in the name & address book, the location and building portions of the data structure hold universal information regarding the two entities, separately from any policies sold. Any application can then use that information by holding a simple pointer back to the underwriting components' location or building, as with the participant function of name & address.

In addition, locations and buildings can be related to a name & address entry according to the present invention, and this information can be carried throughout other systems using the name & address book as a corporate name & address book. FIG. 27 illustrates two points. First, it illustrates that location and building can be used as the master repository of location and building information for all of the insurance carrier's systems. Second, it illustrates that the location and building information can be attached to name & address records and as those name & address records are re-used across an insurer's systems, the location and building information will be revised. This flexibility in design that allows for maximum re-use of data, thereby increasing the efficiency of the data structure.

In order to provide an example of the benefits of locations and buildings associated to name & address records in this corporate view, assume that there is a carrier that insures a contractor for a general liability policy. In this situation, the exposures and risks are not tied to any one site, but to any site where the contractor may do work. The policy, then, will have no locations or buildings attached to it. Periodically throughout the life of the general liability policy, the insurer will conduct a loss control inspection on some of the many sites where a contractor does work, but not on all of the sites. When those sites are inspected, the locations and buildings will be added into the master building and location repository and attached to the contractor via the loss control system. Assuming that there is a claim made against the general liability policy where locations or buildings have not been stored, if the location of the loss is the same as any one of the sites where the insurer did a loss control inspection, the insurer will be able to re-use all of the location analysis and information in the claims system by simply attaching the location to the new claim. Without the flexibility of relating locations and buildings to a name & address record according to the present invention, the insurer would have no idea that it has already captured much of the information it will need to process a claim, resulting in wasted work.

Insurance companies typically maintain an organizational model, by which it administers work, recognizes workgroup and supervisory relationships; and tracks individual users, their skills, geographic territory served, and types of work for which they are qualified. The underwriting components' organization and performer data structure creates a highly flexible component that allows organizations to reorganize their staff and operations rapidly without altering the other components that require access to the organizational structure or individual performers. This component contains the organization objects and personnel objects that manage this process. The performer allows for the definition of roles and assignment of organizational entities into roles in the context of an entity such as an account (i.e. employee John Smith in the role of Underwriter on an Account). However, the data structure around performer is flexible enough to allow the organizational entity (i.e. an employee) to be related to any kind of entity (i.e. claim or policy). As such, the underwriting components' organization and performer is a unique innovation of the data structure that can be leveraged as the single source of an organization's workforce model.

The separation of organization from performer as shown in FIG. 12, allows the organization great flexibility in defining its team structure for accounts. The insurer may wish to assign an underwriter to an account regardless of the location of the underwriter and the location where the account is handled. For example, the lead underwriter for an account was assigned as Bob Jones who is in the Buffalo, N.Y. office where the account is handled. Later, the insurer decided to handle the account out of its Albany, N.Y. office, but wants to keep Bob Jones as the lead underwriter. In doing so, the owning office would change but the lead underwriter would not need to change. Because of the corporate organization and performer structure, teams can be assigned regardless of geographic location. An alternate example is when the "Broker of Record" changes for a policy. As many underwriters assign their teams based upon the "Broker of Record," this will require a change to the performer in the role of underwriter. In our example, the underwriter would change from Bob Jones to Tom Smith. This change would be enabled by the data structure of the present invention.

The organization and performer structure also works neatly with the task engine that is used to process business rules and generate tasks for members of the organization working on an account. The performer model allows a member of the organization to have an assigned role when that member is assigned to work on an account. That role is a targeted field for the task engine as it routes tasks to an account. For example, John Smith is an employee and he is assigned in the role of underwriter for the agent on ABC Co.'s account. As a submission for new business from ABC Co. arrives at the insurer, the task engine will create a task for the underwriter assigned to that agent with respect to the account. As a result, John Smith will receive a new task to "Review New Submission."

The performer capability also provides great use to an insurer when an employee leaves the organization. In this case, there will be many roles on many different accounts that will need to be reassigned. There will also be many tasks on each of those accounts that will need to be reassigned. The performer structure makes it a simple update to reassign all roles and tasks from one employee to another making the transition of work a much easier and efficient process.

Turning now to FIG. 28, a tree diagram shows an unbundled service account according to the present invention. An unbundled service is a fee-based service provided independently of a policy sold (e.g. boiler inspections, loss control inspections, and claim services). Normally, these services are tied to policies and called "bundled services", but over the past several years carriers have been moving to selling these services alone as "unbundled." Additionally, Third Party Administrators (TPAs) are recognizing the need to manage their business through accounts and not just service contracts for specific customers. The three-tiered structure of the present invention easily applies to these services, as shown for example in FIG. 28 with an unbundled service for each participant of an account. Here is an example of an unbundled service account. An insurer sells boiler inspection services separate from policies. The insurer will have the same need to set up an account and a participant. Instead of a policy, the third level of our structure will be the boiler inspection service subscription.

The data structure of the present invention allows the organization to manage its unbundled services in the same way that it would manage a policy-based account. The service structure is a logical mirror image of the policy structure, and the data structure has translated this into its physical data structure. Insurers still have the ability to bundle services with policies together with the three-tiered structure and manage both concurrently on one account. These capabilities are currently not supported in conventional underwriting, customer management, policy or service systems.

Figure 29:
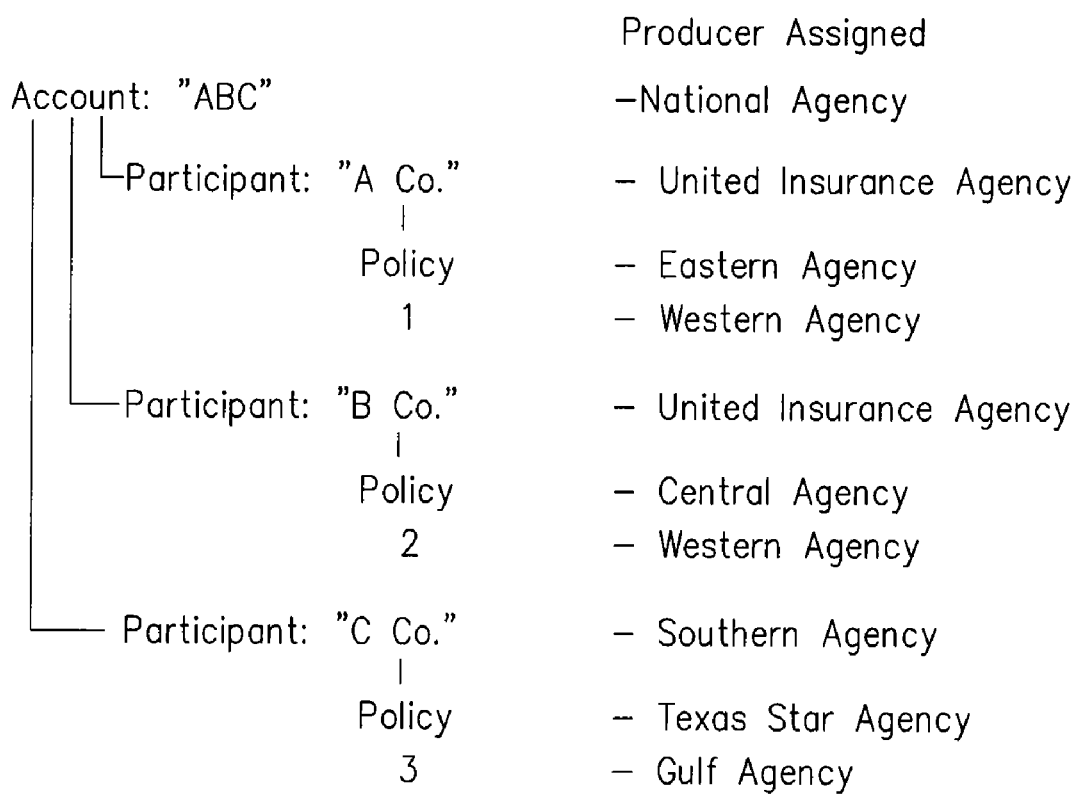
FIG. 29 is a tree diagram showing the assignment of producers for each level of a three tier structure according to the present invention.

Turning now to FIG. 29, a tree diagram shows the assignment of producers for each level of a three tier structure according to the present invention. A further advantage of the data structure of the present invention is that it allows an insurer to manage producers in the context of programs. An insurer now has the ability to have different types of producers with very different roles on a program or account. For example, the producer called National Agency may be a retail producer for the Account "ABC", but may be a secondary, wholesale producer for a program of products and services that the insurer has created and marketed exclusively through designated producers. These different roles can be recognized at the different account and program levels. The ability to track these different kinds of roles for a producer as it is involved with different accounts, programs or other forms of products is very important in regards to the calculations of commissions and profit sharing, profitability assessment, book management, etc. Currently, these calculations and performance assessments are not an electronic process, but a difficult manual one.

Figures 30, 31:
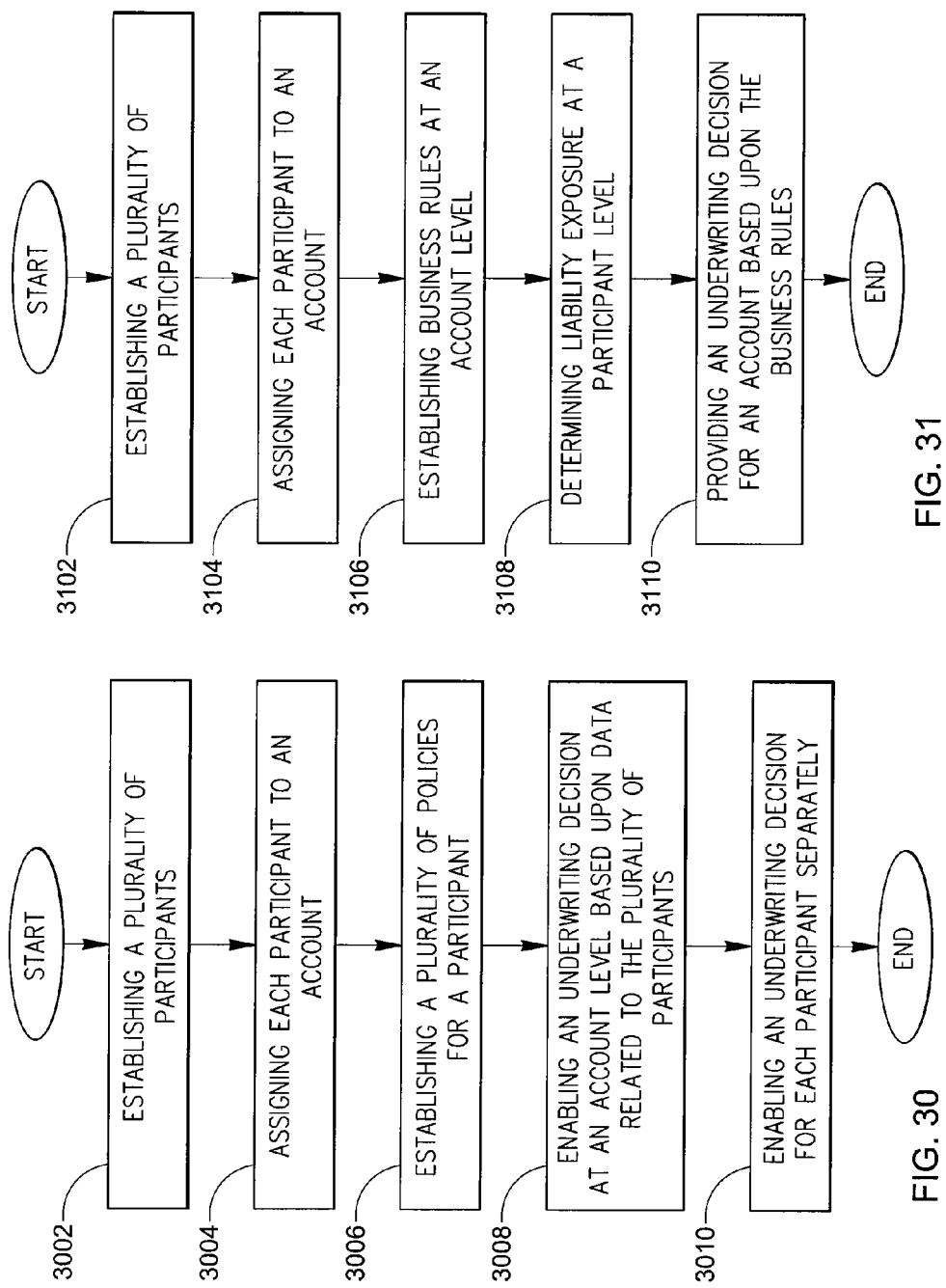
FIG. 30 is a flow chart showing a method of enabling an underwriting decision at an account level according to the present invention.
FIG. 31 is a flow chart showing a method of providing an underwriting decision for an account based upon business rules established at an account level according to the present invention.

Turning now to FIG. 30, a flow chart shows a method of enabling an underwriting decision at an account level according to the present invention. A plurality of participants is established at a step 3002. Each participant is assigned to an account at a step 3004. A plurality of policies is established for a participant at a step 3006. An underwriting decision is determined at an account level based upon data related to a plurality of participants at a step 3008. An underwriting decision is determined for each participant separately at a step 3010.

Turning now to FIG. 31, a flow chart showing a method of providing an underwriting decision for an account based upon business rules established at an account level according to the present invention. A plurality of participants is established at a step 3102. Each participant is assigned to an account at a step 3104. Business rules are established at an account level at a step 3106. Liability exposure is determined at a participant level at a step 3108. Finally, an underwriting decision is provided for an account based upon business rules at a step 3110.

Turning now to FIG. 32, a flow chart shows a method of assigning team members and tasks to an account according to the present invention. A plurality of participants is established at a step 3202. Each participant is assigned to an account at a step 3204. Team members are assigned to an account at a step 3206, and tasks are assigned to team members for an account at a step 3208.

Turning now to FIG. 33, a flow chart shows a method of providing services based upon a separate name and address book according to the present invention. A plurality of participants is established at a step 3302. Each participant is assigned to an account at a step 3304. A separate name and address book are provided at a step 3306. A service associated with an entry in a name and address book is provided at a step 3308. Finally, a service provided with a separate location is provided at a step 3310.

In summary, the data structure has been built with the flexibility around each of its main entities (Account, Name & Address, Policy, Participant, Product, Services etc) so that it can be implemented at any underwriting client. However, this flexibility is not limited only to underwriting; the data structure is also innovative and flexible enough to be used across many business processes of an insurance organization, and even across other industries such as Banking and Finance.

The flexibility to be applied across many industries is enhanced by the encapsulation of many of the data structures. The separation of the Name & Address book from the Participant record can be applied to any business model where customers/clients need to be maintained and added to a product or service that is sold and managed. Organization and performer can be applied to every organization in the world, as it is flexible to maintain any organization structure. Further, performer can be used to assign team members or organization entities to any form of work. The separation of locations from buildings can be used by many different industries such as banking and real estate where it is necessary to track mortgages, loans and individual buildings. This structure is also applicable to any industry that uses GIS techniques or geophysical analysis. All of these data structure components can be taken out of the data structure of the present invention and easily fit into any application model as a result of their encapsulated design.

Further, the three-tiered account structure can be applied to any organization that has a need to manage its products and services and customers in the context of an account. By simply replacing the policy and service tables, any other form of a product can be easily placed into the data structure and function with all the same benefits of the three-tiered structure. Combined with many of the data structures components, the three-tiered structure of the data structure is virtually universal.

The flexibility and encapsulation of the data structure does not sacrifice the granularity required of insurance applications. The tables within the model can be easily enhanced with even more to fit any insurance carrier or an organization from another industry. The ability to provide the flexibility and encapsulation to apply the data structure to virtually any account-based business model (insurance or non-insurance) without sacrificing the granularity of data may be, overall, the most significant innovation of the data structure.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising:
   at least one processor establishing a plurality of participants by assigning each participant to one of a plurality of accounts, the plurality of participants comprising:
   a first participant representing a first customer for a first account and a second participant representing a second customer for the first account;
   at least one processor storing data related to the plurality of participants, the first account and a second account in a database comprising a data structure encoded on a computer-readable memory, said data structure comprising a first tier, a second tier and a third tier, wherein the first tier comprises an account entity class, the second tier comprises a customer entity class, and the third tier comprises a product entity class, wherein the customer entity class includes a plurality of customer entities that store data related to the plurality of participants, and wherein the account entity class includes a plurality of account entities that store data related to the first account and the second account, wherein the product entity class includes a plurality of product entities that store data related to products available for offer to the plurality of participants;
   at least one processor performing underwriting pattern analysis on data at each of the first tier, the second tier and the third tier of the data structure;
   at least one processor providing an account level underwriting decision at an account level based upon data related to individual participants of the plurality of participants assigned to the first account and the underwriting pattern analysis; and
   displaying, on a display, data related to the account level underwriting decision.

2. The method of claim 1, further comprising: providing a participant level underwriting decision for each participant separately, based upon data related to the plurality of participants assigned to the first account.

3. The method of claim 1, further comprising: establishing a plurality of insurance policies for a participant from the plurality of participants, based upon data related to the plurality of participants assigned to the first account.

4. The method of claim 1, wherein a foreign key relationships with at least one of the plurality of account entities and with at least one of the plurality of customer entities are used to retrieve data to provide an account level underwriting decision at an account level for the account based upon data related to the first participant and the second participant assigned to the first account, and the first account.

5. The method of claim 1, wherein providing account level underwriting decision at an account level comprises providing an account level underwriting decision based upon business rules for an account.

6. The method of claim 5, wherein providing account level underwriting decisions at an account level comprises providing at least one account level underwriting decision based upon all insurance policies of the first account, wherein a plurality of insurance policies for the plurality of participants comprises the all insurance policies of the first account insurance policy of the second account.

7. A method comprising: executing processor executable computer instructions by a processor coupled to a computer-readable memory, wherein the computer instructions cause the processor to:
establish a plurality of participants by assigning each participant to one of a plurality of accounts, the plurality of participants comprising: a first participant representing a first customer for a first account; and a second participant representing a second customer for the first account;
store data related to the plurality of participants, the first account and a second account in a database comprising a data structure encoded on the computer-readable memory, said data structure comprising a first tier, a second tier and a third tier,
wherein the first tier comprises an account entity class, the second tier comprises a customer entity class, and the third tier comprises a product entity class,
wherein the customer entity class includes a customer involvement entity class that comprises a plurality of customer involvement entities, wherein the account entity class includes an account involvement entity class that comprises a plurality of account involvement entities,
wherein the product entity class includes a plurality of product entities that store data related to products available for offer to the plurality of participants, wherein the plurality of customer involvement entities store data related to the plurality of participants, and
wherein the plurality of account involvement entities store data related to the first account and the second account;
establish business rules at an account level;
perform underwriting pattern analysis on data at each of the first tier, the second tier and the third tier of the data structure;
provide an underwriting decision for an account based upon the business rule and the underwriting pattern analysis; and
display data related to the underwriting decision.

8. The method of claim 7, further comprising: determining potential risk exposure of the first account at a participant level.

9. The method of claim 7, wherein at least one of the plurality of participants represents a customer that owns a plurality of businesses, wherein each business of the plurality of businesses is identified individually by a business entity identifier.

10. The method of claim 7, wherein the computer instructions further cause the processor to: establish a plurality of participants comprises establishing at least one of the plurality of participants having a plurality of insurance policies.

11. The method of claim 7, wherein the computer instructions further cause the processor to provide the underwriting decision for an account further provides the underwriting decision based upon the plurality of participants assigned to the first account.

12. The method of claim 10, wherein the computer instructions further cause the processor to determine potential risk exposure of the first account based on a first potential risk exposure and a second potential risk exposure for a first set of businesses and a second set of businesses, respectively,
wherein each business of the first set of businesses and second set of businesses is identified individually by a business entity identifier, and
wherein the at least one participant having a plurality of insurance policies has a plurality of businesses including the first set of businesses.

13. The method of claim 12, wherein the plurality of insurance policies of the one participant having a plurality of insurance policies does not include a policy for the first set of businesses.

14. The method of claim 12, wherein a former participant of the second account is no longer assigned to the second account, and wherein the former participant of the second account has a second set of businesses, identifying the second customer, represented by the second participant assigned to the first account, as the former participant of the second account represented by a third participant.

15. The method of claim 13, wherein the computer instructions further cause the processor to provide the underwriting decision for an account further provides the underwriting decision based upon the plurality of participants and a former participant of the first account representing a third customer, where the former participant of the first account is no longer assigned to the first account.

16. A system comprising: a processor; a display; a memory coupled to the processor;
an application program comprising instructions executable by the processor that cause the processor to: establish a plurality of participants by assigning each participant to one of a plurality of accounts, the plurality of participants comprising:
a first participant representing a first customer for a first account and a second participant representing a second customer for the first account;
store data related to the plurality of participants, the first account and a second account in a database comprising a data structure encoded on a computer-readable memory, said data structure comprising a first tier, a second tier and a third tier,
wherein the first tier comprises an account entity class, the second tier comprises a customer entity class, and the third tier comprises a product entity class,
wherein the customer entity class includes a plurality of customer entities that store data related to the plurality of participants, and
wherein the account entity class includes a plurality of account entities that store data related to the first account and the second account, wherein the product entity class includes a plurality of product entities that store data related to products available for offer to the plurality of participants;
perform underwriting pattern analysis on data at each of the first tier, the second tier and the third tier of the data structure;
provide an account level underwriting decision at an account level based upon data related to individual participants of the plurality of participants assigned to the first account and the underwriting pattern analysis; and
display, on the display, data related to the account level underwriting decision.

17. The system of claim 16, wherein the application program comprising instructions that further cause the processor to provide a participant level underwriting decision for each participant separately, based upon data related to the plurality of participants assigned to the first account.

18. The system of claim 16, wherein the application program comprising instructions that further cause the processor to establish a plurality of insurance policies for a participant from the plurality of participants, based upon data related to the plurality of participants assigned to the first account.

19. A machine readable medium comprising:
processor executable instructions encoded on the machine readable medium, wherein the processor executable instructions cause the processor to:
 establish, in a memory coupled to the processor, a plurality of participants by assigning each participant to one of a plurality of accounts, the plurality of participants comprising: a first participant representing a first customer for a first account and a second participant representing a second customer for the first account;
 store data related to the plurality of participants, the first account and a second account in a database comprising a data structure encoded on a computer-readable memory, said data structure comprising a first tier, a second tier and a third tier,
 wherein the first tier comprises an account entity class, the second tier comprises a customer entity class, and the third tier comprises a product entity class,
 wherein the customer entity class includes a plurality of customer entities that store data related to the plurality of participants, and wherein the account entity class includes a plurality of account entities that store data related to the first account and the second account,
 wherein the product entity class includes a plurality of product entities that store data related to products available for offer to the plurality of participants;
 perform underwriting pattern analysis on data at each of the first tier, the second tier and the third tier of the data structure;
 provide an account level underwriting decision at an account level based upon data related to individual participants of the plurality of participants assigned to the first account and the underwriting pattern analysis; and
 display, on a display, data related to the account level underwriting decision.

20. The machine readable medium of claim 19, where the processor executable instructions further cause the processor to provide a participant level underwriting decision for each participant separately, based upon data related to the plurality of participants assigned to the first account.

21. The machine readable medium of claim 19, where the processor executable instructions further cause the processor to establish a plurality of insurance policies for a participant from the plurality of participants, based upon data related to the plurality of participants assigned to the first account.

* * * * *